US012137856B2

(12) United States Patent
Tamino et al.

(10) Patent No.: US 12,137,856 B2
(45) Date of Patent: Nov. 12, 2024

(54) TRAJECTORY-BASED LOCALIZATION AND MAPPING

(71) Applicant: iRobot Corporation, Bedford, MA (US)

(72) Inventors: Daniele Tamino, Monrovia, CA (US); Artem Gritsenko, Stoneham, MA (US); Andrea M. Okerholm Huttlin, Needham, MA (US); Arman Karimian, Watertown, MA (US); Benjamin Pheil, Ontario, NY (US); Yao Chen, London (GB); Renaud Moser, Pasadena, CA (US); Jose Luis Franco Monsalve, Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 239 days.

(21) Appl. No.: 17/532,863

(22) Filed: Nov. 22, 2021

(65) Prior Publication Data
US 2023/0157506 A1 May 25, 2023

(51) Int. Cl.
*A47L 11/40* (2006.01)
*G05D 1/00* (2006.01)

(52) U.S. Cl.
CPC ........ *A47L 11/4011* (2013.01); *G05D 1/0219* (2013.01); *G05D 1/0238* (2013.01); *G05D 1/0274* (2013.01); *A47L 2201/04* (2013.01)

(58) Field of Classification Search
CPC ............. A47L 11/4011; A47L 2201/04; G05D 1/0219; G05D 1/0238; G05D 1/0274; G05D 2201/0203; G01C 21/383
See application file for complete search history.

(56) References Cited

U.S. PATENT DOCUMENTS

| 7,085,624 B2 | 8/2006 | Aldred et al. |
| 9,630,319 B2 | 4/2017 | Vicenti |
| 2004/0167669 A1 | 8/2004 | Karlsson |
| 2005/0046373 A1 | 3/2005 | Aldred et al. |

(Continued)

FOREIGN PATENT DOCUMENTS

WO WO 2014151408 9/2014

OTHER PUBLICATIONS

Wolfson, "On curve matching," IEEE Transactions on Pattern Analysis and Machine Intelligence, May 1990, 12:483-489.

(Continued)

*Primary Examiner* — Joan T Goodbody
*Assistant Examiner* — Godfrey Aleksander Maciorowski
(74) *Attorney, Agent, or Firm* — Fish & Richardson P.C.

(57) ABSTRACT

An autonomous robot is maneuvered around a feature in an environment along a first trajectory. Data characterizing the first trajectory is stored as a trajectory landmark. The autonomous cleaning robot is maneuvered along a second trajectory. Data characterizing the second trajectory is compared to the trajectory landmark. Based on comparing the data characterizing the second trajectory to the trajectory landmark, it is determined that the first trajectory matches the second trajectory. A transform that aligns the first trajectory with the second trajectory is determined. The transform is applied to an estimate of a position of the autonomous cleaning robot as a correction of the estimate.

30 Claims, 12 Drawing Sheets

(56) References Cited

U.S. PATENT DOCUMENTS

| | | | |
|---|---|---|---|
| 2007/0156286 A1* | 7/2007 | Yamauchi | G05D 1/0278 |
| | | | 700/245 |
| 2012/0317744 A1 | 12/2012 | Gilbert et al. | |
| 2014/0129027 A1 | 5/2014 | Schnittman | |
| 2014/0246874 A1 | 9/2014 | Hickey et al. | |
| 2016/0271795 A1 | 9/2016 | Vicenti | |
| 2017/0239813 A1* | 8/2017 | Vicenti | G05D 1/622 |
| 2019/0250625 A1* | 8/2019 | Kleiner | A47L 9/0488 |
| 2020/0117214 A1* | 4/2020 | Jonak | G06T 7/593 |
| 2022/0080600 A1* | 3/2022 | Kearns | G01S 17/93 |

OTHER PUBLICATIONS

International Search Report and Written Opinion in International Appln. No. PCT/US2022/075912, mailed Dec. 5, 2022, 14 pages.
International Preliminary Report on Patentability in International Appln. No. PCT/US2022/075912, mailed on Jun. 6, 2024, 9 pages.

* cited by examiner

TRAJECTORY-BASED LOCALIZATION AND MAPPING

TECHNICAL FIELD

The disclosure generally relates to navigation of mobile devices. In particular, the disclosure relates to localization and mapping techniques that can be used in mobile devices such as mobile robots.

BACKGROUND

Localization techniques of mobile robots can include processes that allow a robot to determine its position and orientation (or "pose") with respect to its surroundings. A robot that can build a map of its surroundings can localize itself within the map to exhibit a degree of autonomy. This process of building a map and using the generated map is known as Simultaneous Localization and Mapping (SLAM). SLAM relates to the building of a map (mapping) and the use of the map (localizing), and therefore includes a process associated with localization and a process associated with mapping. The robot can execute these processes simultaneously or in a multiplexed fashion. SLAM techniques can include building a map using odometry, mechanical contact sensors or non-contact ranging sensors such as a laser rangefinder or image based sensor.

SUMMARY

As an autonomous robot, such as a cleaning robot, moves about an environment, the robot continuously generates pose estimates that provide an estimated position and bearing of the robot in a global reference frame. As the robot navigates the environment, the robot generates trajectory landmarks that characterize the robot's trajectories in navigating around various environmental features. Trajectory landmarks are chosen by the robot to be useful for subsequent re-localization without being too difficult to navigate or imposing too-high burdens on the robot's computation. The trajectory landmarks can be curved or otherwise non-straight and can be navigated in relation to furniture and other clutter features. To re-localize itself to the environment, the robot can return to one or more of the pre-stored trajectory landmarks and attempt to re-navigate along the same trajectory. Curve-matching or another algorithm is used to confirm that the robot has successfully re-traversed the chosen trajectory landmark. If so, the robot determines a transform that maps the new trajectory to the trajectory landmark. This same transform, when applied to the robot's pose estimate, represents a correction to the pose estimate that re-localizes the robot to its environment. In some aspects, this disclosure described a method, such as a method performed at least partially by a cleaning robot controller. According to the method, an autonomous robot is maneuvered around a feature in an environment along a first trajectory. Data characterizing the first trajectory is stored as a trajectory landmark. The autonomous cleaning robot is maneuvered along a second trajectory. Data characterizing the second trajectory is compared to the trajectory landmark. Based on comparing the data characterizing the second trajectory to the trajectory landmark, it is determined that the first trajectory matches the second trajectory. A transform that aligns the first trajectory with the second trajectory is determined. The transform is applied to an estimate of a position of the autonomous cleaning robot as a correction of the estimate.

Implementations of this and other methods can have any one or more of at least the following characteristics.

In some implementations, the first trajectory is curved.

In some implementations, the feature includes a wall, and the first trajectory follows the wall around at least one corner of the wall.

In some implementations, the position is defined by a first horizontal component, a second horizontal component, and an orientation, and applying the transform to the estimate includes correcting estimates of the first horizontal component, the second horizontal component, and the orientation of the estimate with the transform.

In some implementations, maneuvering the autonomous cleaning robot along the first trajectory includes maneuvering the autonomous cleaning robot from an anchor location to a second location; determining that the second location is the anchor location; and in response to determining that the second location is the anchor location, ending navigating of the first trajectory.

In some implementations, maneuvering the autonomous cleaning robot along the second trajectory is performed in response to determining that a confidence level of the estimate is below a threshold value.

In some implementations, comparing the data characterizing the second trajectory to the trajectory landmark includes performing curve-matching between the second trajectory and the first trajectory. In some implementations, performing the curve-matching includes performing curve-matching between a curvature of the second trajectory and a curvature of the first trajectory, or between a turning radius of the second trajectory and a turning radius of the first trajectory. In some implementations, performing the curve-matching includes identifying matching sub-segments of the first trajectory and the second trajectory. In some implementations, performing the curve-matching includes evaluating the first trajectory and the second trajectory in a common reference frame in which an anchor of the first trajectory is aligned with an anchor of the second trajectory.

In some implementations, determining that the first trajectory matches the second trajectory includes determining a distance metric between the first trajectory and the second trajectory, and determining that the distance metric is less than a threshold value.

In some implementations, wherein determining the transform includes identifying one or more pairs of aligned points between the first trajectory and the second trajectory; and determining the transform as a transform that aligns the one or more pairs of aligned points with one another. In some implementations, a first pair of the one or more pairs includes an anchor of the first trajectory or an anchor of the second trajectory. In some implementations, the one or more pairs lie in matching sub-segments of the first trajectory and the second trajectory.

In some implementations, the method includes, based on comparing the data characterizing the second trajectory to the trajectory landmark, determining that an environmental feature maneuvered around to generate the second trajectory is the feature; and based on determining that the environmental feature maneuvered around to generate the second trajectory is the feature, correcting an internal map of the autonomous cleaning robot.

In some implementations, storing the trajectory landmark includes storing a time taken by the autonomous cleaning robot to traverse the first trajectory.

In some implementations, storing the trajectory landmark includes determining a measure of straightness of the first trajectory; and determining to store the trajectory landmark based on the measure of straightness. In some implementations, storing the trajectory landmark includes determining an ambiguity of the first trajectory; and determining to store the trajectory landmark based on the ambiguity. In some implementations, determining the ambiguity includes searching for one or more transforms that transform the first trajectory into itself.

In some implementations, the transform represents an inverse of accumulated drift in the estimate of the position of the autonomous cleaning robot.

In some implementations, maneuvering the autonomous cleaning robot along the second trajectory includes selecting the trajectory landmark from among a plurality of candidate trajectory landmarks; and maneuvering the autonomous cleaning robot to an estimated location of the trajectory landmark. In some implementations, selecting the trajectory landmark is based on a time taken to traverse the first trajectory. In some implementations, selecting the trajectory landmark includes determining a direction of a major axis of an ellipse corresponding to a covariance matrix characterizing uncertainty in the estimate of the position; and selecting the trajectory landmark based on the direction of the major axis.

In some implementations, the first trajectory comprises a closed-loop trajectory. In some implementations, the environmental feature includes furniture. In some implementations, the method includes classifying the trajectory landmark as a clutter landmark based on the first trajectory comprising a closed-loop trajectory. In some implementations, the method includes, based on classifying the trajectory landmark as a clutter landmark, and based on determining that the first trajectory matches the second trajectory, determining a room in the environment, a section of the environment, or a level of the environment in which the robot is located.

In some implementations, maneuvering the autonomous cleaning robot along the second trajectory is performed as a step before cleaning in a cleaning mission.

In some implementations, maneuvering the autonomous cleaning robot along the first trajectory is performed during a cleaning mission.

In some implementations, the feature includes a wall; applying the transform to the estimate of the position includes inputting the transform into a pose graph optimizer; and inputting the transform into the pose graph optimizer includes inputting, into the pose graph optimizer, a dummy value as a transform in a direction parallel to the wall, and inputting, into the pose graph optimizer, an uncertainty corresponding to the dummy value, the uncertainty at least ten times a value of a next-highest uncertainty input into the pose graph optimizer with the transform.

In some implementations, the feature includes a first wall, the second trajectory corresponds to motion in a vicinity of a second wall, and the method includes determining a cropped covariance matrix of relative motion in the first trajectory and in the second trajectory, the cropped covariance matrix excluding elements corresponding to motion parallel to the first wall or parallel to the second wall; and determining, based on the cropped covariance matrix, whether the first wall is the second wall.

In other aspects, this disclosure describes an autonomous cleaning robot. The autonomous cleaning robot includes a drive system configured to move the autonomous cleaning robot about a floor surface in an environment; a cleaning system configured to clean the floor surface as the autonomous cleaning robot moves about the floor surface; a sensor system; and a controller operably coupled to the drive system, the cleaning system, and the sensor system, the controller configured to perform operations. The operations can include any one or more of the above-noted methods, or other methods described in this disclosure.

These and other features of the robotic system can provide one or more advantages. Using sensors already conventionally present on mobile robots, such as encoders, bump sensors, gyroscopes, short-range infrared sensors, and accelerometers, decreases the cost of the robotic system and increases the overall manufacturability. For example, the robotic system uses the sensors used for navigation to generate the data for trajectory-based re-localization, thus preventing the need for additional sensors specific to trajectory-based re-localization. The electromechanical systems of the robots can be simpler, less expensive, and have fewer components compared to robots that rely on video systems in conjunction with visual SLAM (VSLAM) for re-localization. Furthermore, the data collected by these sensors tends to be computationally inexpensive compared to high-resolution video data typical of VSLAM. For example, file sizes generated by the sensor can be smaller, such that the system requires less storage.

Trajectory-based re-localization (such as based on transforms) can allow for a wider variety of environmental features to be used for re-localization and can make re-localization more efficient, e.g., by improving the accuracy of re-localization and/or by allowing for full-dimensional re-localization based on a single trajectory landmark. Non-straight landmarks can reduce a time/distance required by the robot to perform re-localization. By contrast, some alternative re-localization methods are mostly restricted to straight wall-based re-localization, limiting the number of possible landmarks and requiring more complex re-localization navigation routines.

The details of one or more implementations are set forth in the accompanying drawings and the written description. Other features, objects, and advantages will be apparent from the description, drawings, and the claims.

DESCRIPTION OF DRAWINGS

Like reference symbols in the various drawings indicate like elements.

DETAILED DESCRIPTION

In simultaneous localization and mapping (SLAM) operations of an autonomous robot intelligently navigating about an environment, the robot senses the environment to map the environment and to localize itself within the environment. The robot can use one or more ranging sensors and one or more dead reckoning sensors to process data pertinent to SLAM and to autonomously generate and update a map. A controller of the robot operates a sensor system to continuously estimate the pose of the robot within the room as the robot moves around and to receive information about the room. A "pose" herein includes a position of the robot within an environment, e.g., at least two horizontal components such as (x, y) components, and in some implementations including an angular orientation (theta) of the robot relative to, for example, a wall or an obstacle (e.g., clutter) in the environment or an absolute (e.g., cardinal) direction.

As the robot navigates, drift accumulates in the estimated pose of the robot. For example, dead-reckoning sensors can provide incorrect movement data that results in the robot's estimate pose being steadily more inaccurate in position (including, e.g., angular orientation). These errors can lead to inaccurate mapping. In some examples of intelligent navigation of the robot, the robot generates trajectories corresponding to one or more environmental features of the environment that the robot can detect using, e.g., sensors on the robot, and stores the trajectories as trajectory landmarks. The trajectory landmarks record paths of the robot navigating around the features of the environment. The robot builds a map of a physical layout of the environment (e.g., one or more rooms or sections within a room), the physical layout including the landmarks. The robot estimates its pose within the environment and, in "re-localization" operations, reduces error in pose estimation using transforms between determined trajectories.

Overview of Robot

Figure 1A:
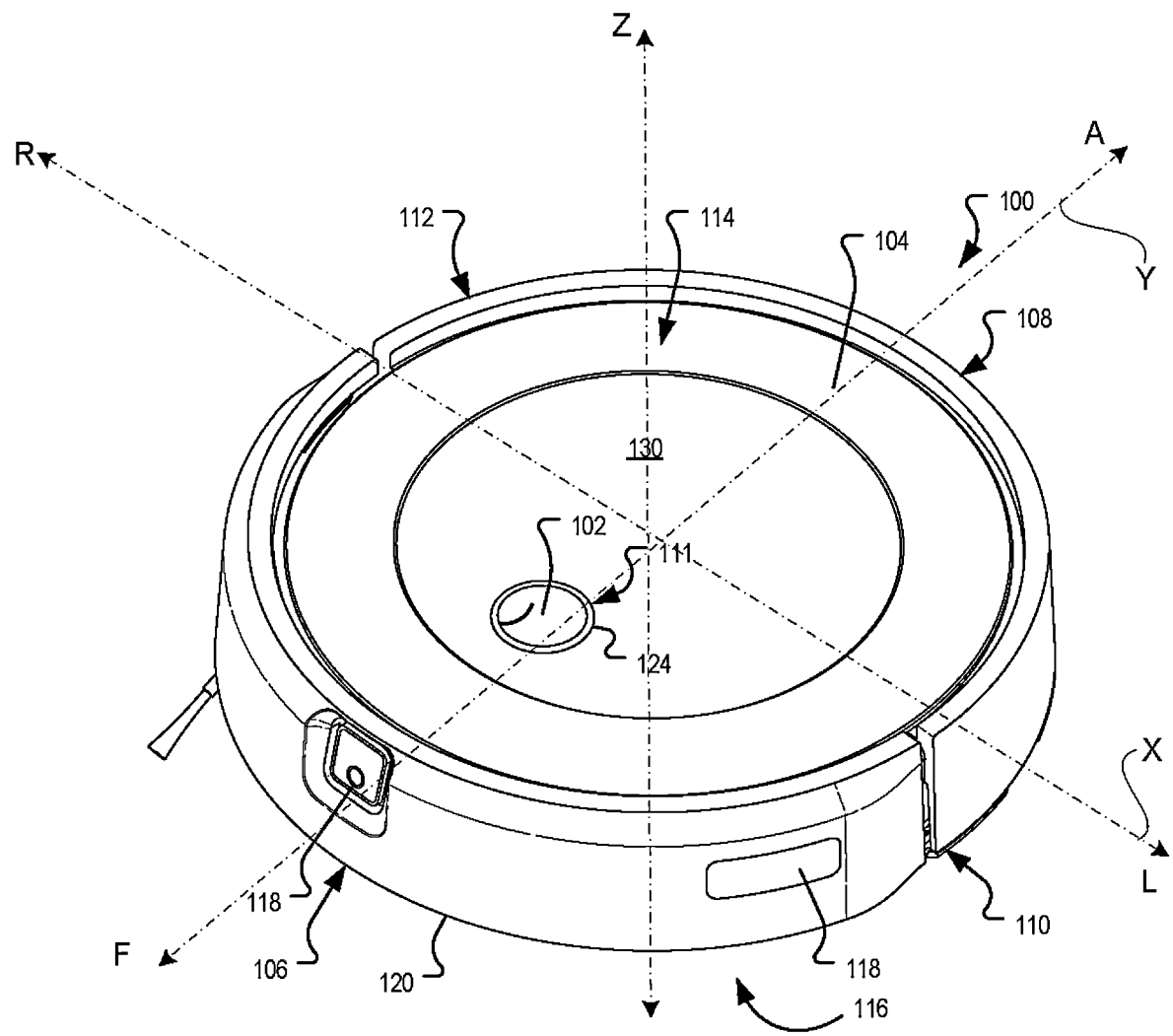
FIG. 1A is a perspective view of a user interacting with a button on an autonomous cleaning robot.
Figure 1B:
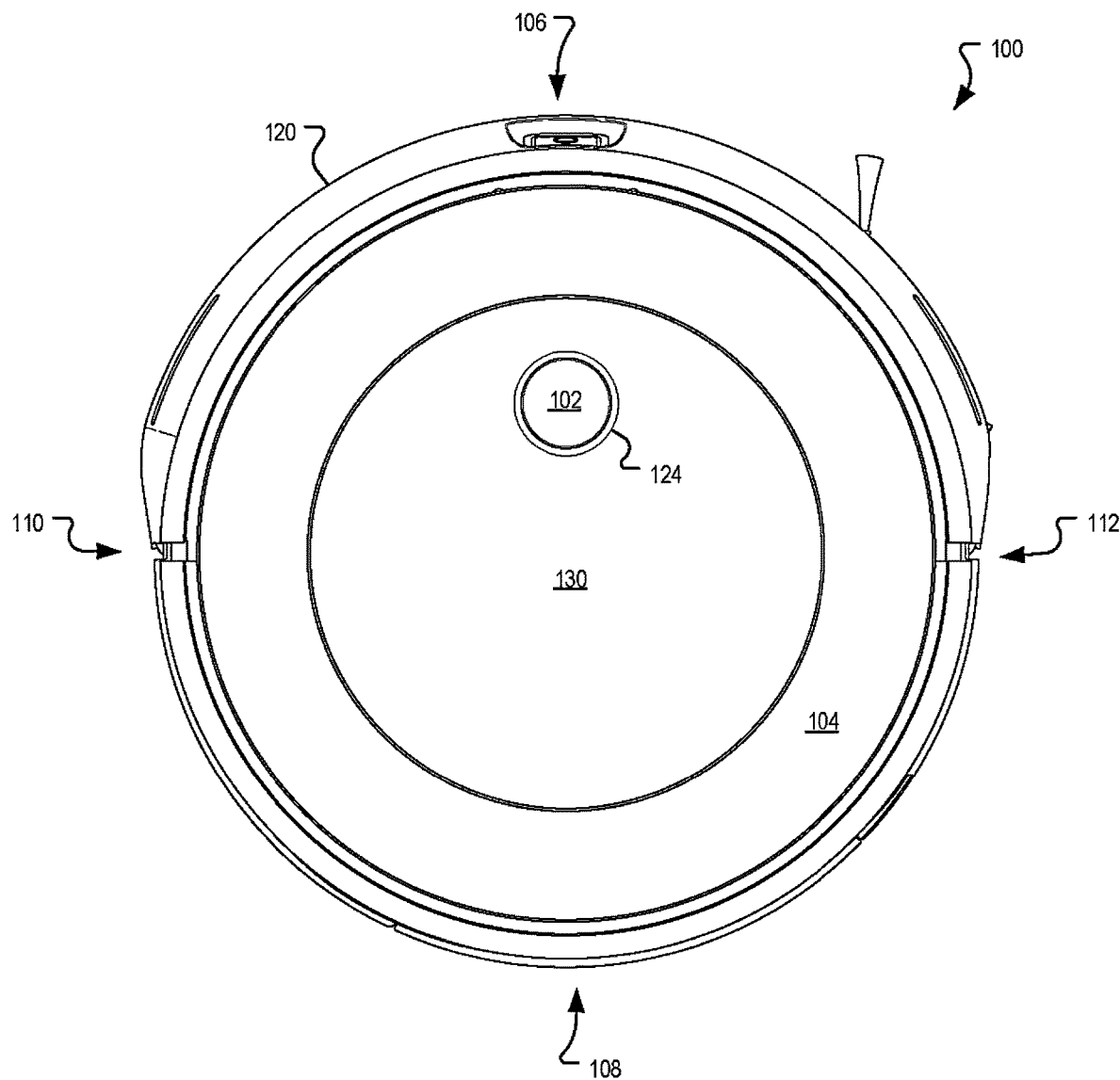
FIGS. 1B-1D are top, side, and bottom views of the autonomous cleaning robot of FIG. 1A.

Referring to FIGS. 1A and 1B, a robot 100 (e.g., an autonomous cleaning robot) includes a body having a front side 106, a back side 108, a left-hand-side 110, a right-hand-side 112, a top 114, and a bottom 116. The body of the robot 100 is circular-shaped such that an outer perimeter of the robot 100 is circular. However, square-shaped or other shaped robot bodies (e.g., Reuleaux triangle-shaped or constant width polygon-shaped) are used in other implementations.

The robot 100 can move across a floor surface of a physical environment through various combinations of movements relative to three mutually perpendicular axes defined by the body: a transverse axis X, a fore-aft axis Y, and a central vertical axis Z. A forward drive direction along the fore-aft axis Y is designated F (referred to hereinafter as "forward"), and an aft drive direction along the fore-aft axis Y is designated A (referred to hereinafter as "rearward"). The transverse axis X extends between a right side R and a left side L of the robot 100 substantially along an axis defined by center points of, referring briefly to FIG. 1D, wheels 122a, 122b.

In this example, the robot 100 includes a one-button user interface in the form of button 102. In some implementations, the button 102 is configured as a toggle switch with two states (e.g., an actuated (e.g., depressed state) and an unactuated (e.g., released state)). In other implementations, the button 102 has more than two states (e.g., a soft press state, a hard press state, a released state, etc.). In this way, the button 102 can be pressed by a user to cause the robot 100 to initiate different behavior. For example, in some cases the user can press the button 102 to enable/disable the robot, to cause the robot to begin a cleaning routine, etc. The robot need not include the button 102; other implementations do not include a button such as button 102, or include other or different buttons.

The robot 100 represented in FIGS. 1A-1D also includes a light indicator 111. The light indicator 111 includes a housing 124 that is mounted flush with the button 102 and a central portion 130 of a top surface 104 of the robot 100. The housing 124 is shaped as a ring around the button 102 and spans an entire circumference (e.g., 360°) of the button 102. A plurality of lights are mounted inside the housing 124 and are individually controllable by a controller of the robot 100 to individually illuminate and transmit light through a translucent portion of the housing 124. In this way, the light indicator 111 is configured as a light ring and illuminates to provide visual indications to the user of the robot 100, such as indications of an operating state of the robot 100. The robot need not include the light indicator 111 and housing 124; other implementations do not include light indicator 111, or include other or different types of indicator.

In some implementations, the robot 100 includes one or more optical sensors, such as infrared sensors. Infrared (IR) sensors (e.g., infrared ranging sensors) emit infrared light laterally and/or up with respect to the robot 100 (e.g., so as to emit the infrared light towards walls and other obstacles), detect a reflection of the infrared light, and use the reflection to determine a distance from the infrared sensors to the obstacle that reflected the infrared light. Optical sensors, including infrared sensors, can be located in multiple points on the robot (e.g., at the front 106, back 108, left-hand-side 110, and right-hand-side 112) so as to sense surfaces in various directions with respect to the robot 100. In some implementations, the optical sensors instead or additionally include a range sensor different from an infrared sensor. These sensors can collectively be referred to as obstacle following sensors 118.

In some implementations, the robot 100 includes a bumper 120 that can be actuated by a force of a collision when the robot 100 encounters an obstacle. In some scenarios, a user can actuate the bumper 120 manually. The bumper 120 may include a contact sensor membrane that senses applied force, and the contact sensor membrane may be applied around some or all of the periphery of the robot 100 such that contact with physical structures of the environment are sensed in any direction of movement. In these implementations, the robot 100 can use the location of contact along the contact sensor membrane of the bumper 120 to avoid an obstacle or perform TRAJECTORY MAPPING behavior. In another implementation, the bumper 120 includes a capacitive bumper sensor disposed along front and side surfaces of the bumper 120. In some cases, the capacitive bumper sensor can be disposed upward along a top surface of the bumper 120 so that the capacitive bumper sensor can sense contact with surfaces from additional directions (e.g., from above the robot). Examples of bumpers are disclosed in U.S. patent application Ser. No. 14/277,270, titled "Compliant Solid-State Bumper for Robot," incorporated by reference herein in its entirety.

The bumper 120 can include one or more bump sensors (not shown) configured to generate a bumper actuation signal in response to actuation of the bumper 120 or a particular one of the one or more bump sensors included in the bumper 120. In some examples, each bumper sensor includes a switch, and, in other implementations, the bumper sensor includes a capacitance, inductance, a Hall effect, or other sensor. In some cases, when the robot 100 contacts an obstacle, more than one of the bump sensors can be triggered sequentially. The robot 100 can use the sequential triggering of the bump sensors to avoid an obstacle or perform TRAJECTORY MAPPING behavior.

Figure 1C:
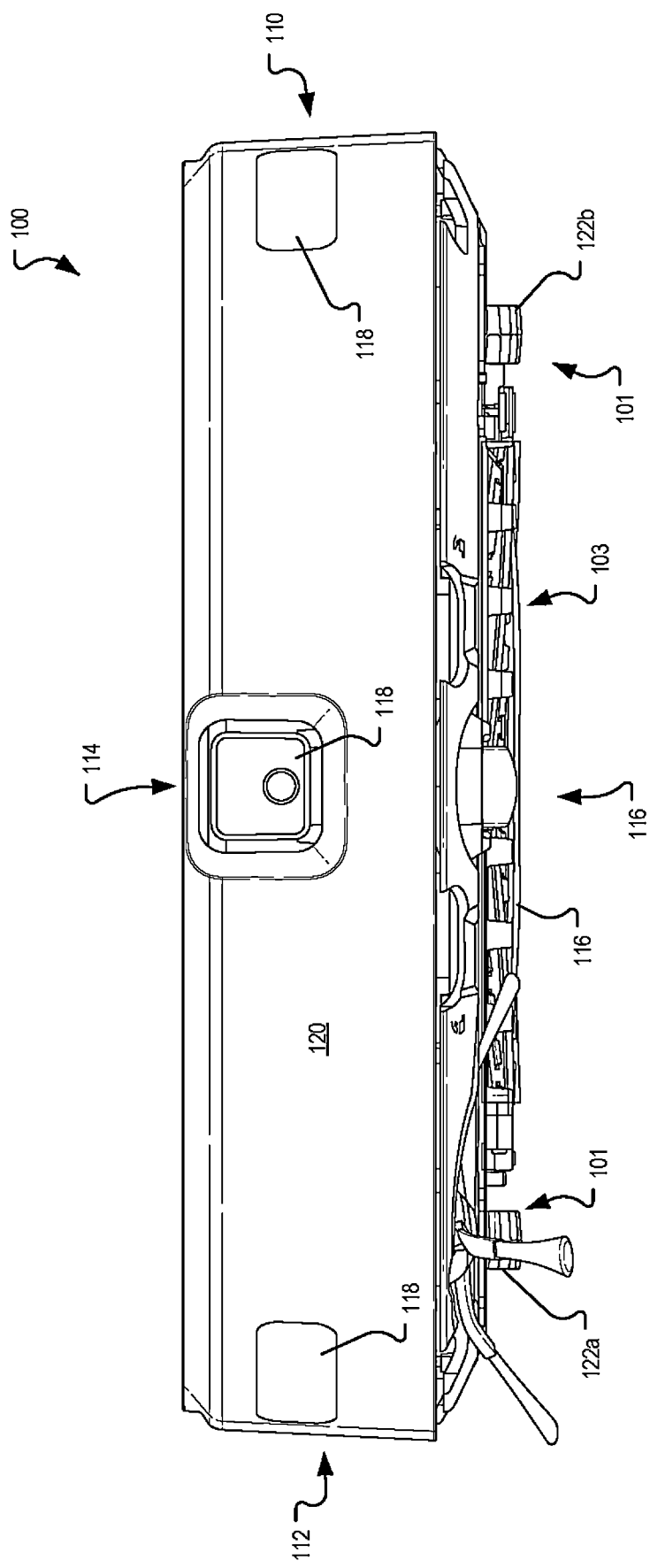
Figure 1D:
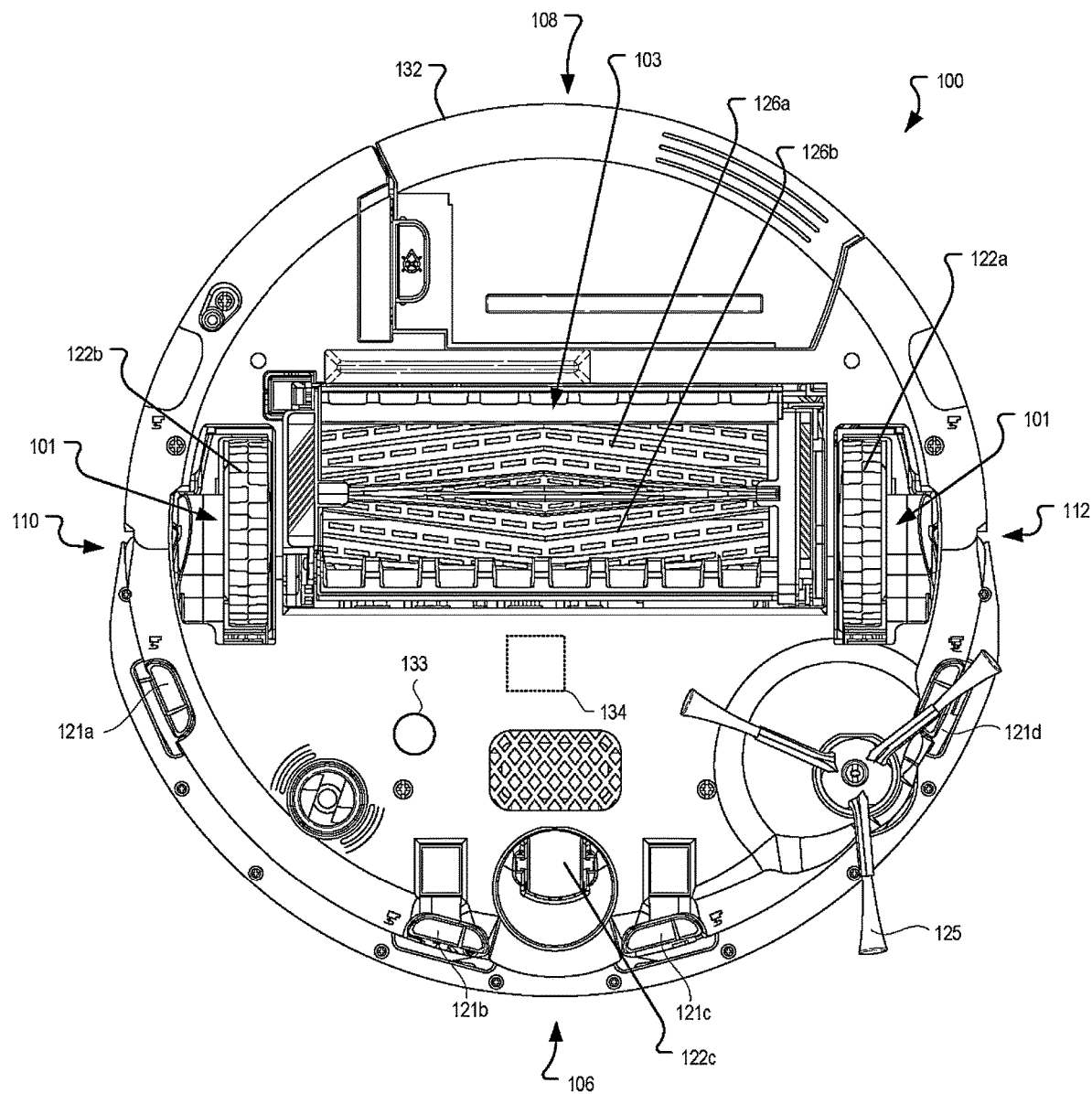

Referring to FIGS. 1C and 1D, the robot 100 includes a drive system 101 configured to maneuver the robot 100 about a floor surface. The drive system 101 includes two wheels 122a, 122b that are both rotatable to maneuver the robot 100 and also movable between a first position in which the wheels 122a, 122b are extended relative to a bottom surface of the robot 100 and a second position in which the wheels 122a, 122b are retracted relative to the bottom surface of the robot 100. In some implementations, wheel 122a and wheel 122b are independently movable between the first position and the second position. The robot 100 also includes a third wheel 122c which is an undriven caster wheel. As one or more motors drive the wheels 122a, 122b, in some implementations rotary encoders measure the position of a motor shaft of the motor(s) that rotates the wheels 122a, 122b. As will be discussed below, an odometry system can use the rotary encoders to estimate the distance travelled by the robot 100.

Other sensors that can be included in some implementations include an optical mouse sensor 133 and an inertial measurement unit (IMU) 134 disposed on the bottom 116 of the robot 100. The optical mouse sensor 133 includes a light source and a low-resolution camera. The light source illuminates the floor beneath the robot body as the robot 100 navigates about the environment, and the low-resolution camera continuously records and compares sequential low-resolution images (e.g., about 20×20 pixels) of the floor. As will be described later, the robot 100 can use the optical mouse sensor 133 to estimate drift in the x and y directions as the robot 100 navigates about the environment.

The IMU 134 includes a 3-axis accelerometer and a 3-axis gyroscope. The 3-axis accelerometer measures x, y, and z acceleration, and the 3-axis gyroscope measures rotation about the x-, y-, and z-axes (e.g., pitch, yaw, and roll). As will be described below, the accelerator of the IMU 134 can be used to estimate drift in the x and y directions, and the gyroscope of the IMU 134 can be used to estimate drift in the orientation θ of the robot 100.

The robot 100 includes multiple cliff sensors 121a-d located near the forward edges of the robot body, at a distance from the wheels 122a-b that enables the robot 100 to receive a cliff sensor signal and have time to stop the wheels 110a-b before moving off a sensed drop. Each cliff sensor 121a-d is disposed near one of the side surfaces so that the robot 100 can detect an incoming drop or cliff from either side of its body. Each cliff sensor 121a-d emits radiation, e.g. infrared light, and detects a reflection of the radiation to determine the distance from the cliff sensor 121a-d to the surface below the cliff sensor 121a-d. A distance larger than the expected clearance between the floor and the cliff sensor 121a-d, e.g. greater than 2 mm, indicates that the cliff sensor 121a-d has detected a cliff-like obstacle or environmental element in the floor topography.

The drive system 101 includes drive wheel sensors to measure whether the wheels 122 are in the first position, the second position, or an in-between position. In some examples, the drive system 101 includes a drive wheel sensor associated with each wheel 122. In some examples, the drive wheel sensors include a switch or IR break beam sensor. In some examples, the wheels 122 are biased away from the robot 100 using one or more springs. Additionally, information generated by the drive wheel sensors can be used by a controller of the robot 100 to determine that a wheel is "off the ground" when the respective wheel is fully extended from the robot 100. Similarly, information generated by the drive wheel sensors can be used by the controller of the robot 100 to determine that a wheel is "on the ground" when the respective wheel is less than fully extended from the robot 100.

The robot 100 includes a cleaning system 103 to clean a floor surface underneath the robot 100. The cleaning system 103 cleans the floor as the robot 100 is maneuvered about the floor surface using the wheels 122a, 122b of the drive system 101 of the robot 100. In the implementations represented in FIGS. 1C and 1D, the cleaning system 103 includes rotatable rollers 126a, 126b and a vacuum system including a motor and an impeller to generate an airflow at a cleaning inlet between the rollers 126a, 126b. A side brush 125 extends beyond the perimeter of the robot body to ensnare debris in crevices and along edges in proximity to the robot 100, sweeping the debris into the cleaning inlet. However, in other implementations, the cleaning system 103 can be a mopping system with a mop that faces the floor surface and scrubs the floor surface as the robot 100 is maneuvered about the floor surface.

In some implementations, the robot 100 includes a bin 132 removably attached to the robot 100. The bin 132 defines a volume where debris can be collected by the rollers 126a, 126b and the vacuum system of the cleaning system 103 and deposited into the bin 132. The robot 100 also includes a bin sensor configured to generate a bin attachment signal in response to a presence of the bin 132 being attached the robot 100. In some implementations, the robot 100 can be docked in a docking station to evacuate the bin and/or to recharge the battery of the robot 100.

The hardware of the robot herein can include aspects of the robotic system disclosed in application no. PCT/US2014/025665 filed on Mar. 13, 2014 and titled "Roller brush for surface cleaning robots" and U.S. application Ser. No. 13/460,261 filed on Apr. 30, 2012 and titled "Robotic Vacuum," both of which are hereby incorporated by reference in their entirety.

Control Systems Hardware

Figure 1E:
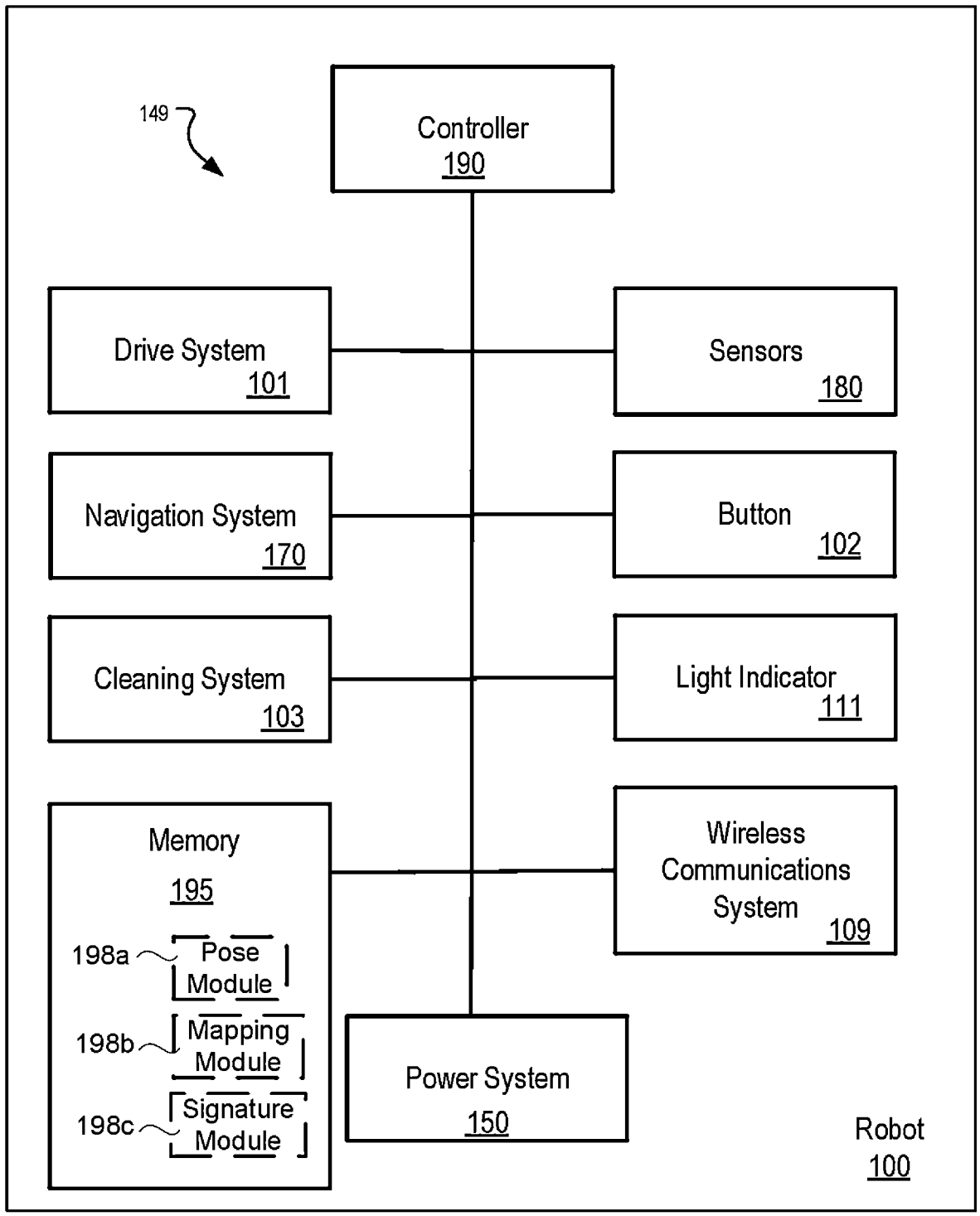
FIG. 1E shows a block diagram of an example control system implemented on the example autonomous robot of FIGS. 1A-1D.

Now referring to FIG. 1E, the body of the robot 100 houses a control system 149 that includes a power system 150, the cleaning system 103, the drive system 101, a navigation system 170, a sensor system 180, a controller circuit 190 (herein also referred to as "controller 190"), the button 102, the light indicator 111 (e.g., each of the plurality of lights of the light indicator 111), a wireless communication system 109 (e.g., transceivers of the robot 100), and a memory storage element 195. The power system 150, which includes a power source (e.g., a battery), provides electric power to the systems operable with the robot 100. The power system 150 can further include a charging system within the power system 150 that is connectable to an external charging dock to charge the power source. In this example, the cleaning system 103 uses rollers 126a-b, the side brush 125, and a vacuum system (e.g., including a fan housed in the robot body) to ingest debris. In various other implementations, the cleaning system 103 can include fewer components, more components, or other combinations of components. For example, a cleaning system can include one roller or more than two rollers, no side brush or more than one side brush, a cleaning pad, and/or other components that provide cleaning functionality.

The drive system 101 can maneuver the robot 100 across the floor surface based on a drive command having x, y, and θ components (shown in FIG. 1A). The drive system 101 controls motors to drive wheels 122a-b such that the wheels 122a-b can propel the robot 100 in any drive direction along the floor surface. The wheel modules can be differentially operated such that the robot can turn based on a level of drive supplied to each drive wheel 122a-b. In some implementations, independent motors drive each wheel 122a-b such that the wheels 122a-b can rotate independently from one another. As a result, independent rotation of the wheels 122a-b can rotate the forward drive direction F of the robot 100 to a new heading.

The navigation system 170, a behavior-based system executed on the controller 190, can send instructions to the drive system 101 so that the robot 100 can use the drive system 101 to navigate an environment. The navigation system 170 communicates with the sensor system 180 to issue drive commands to the drive system 101.

In implementations, the sensor system 180 includes sensors disposed on the robot 100, such as the obstacle following sensors 118, the rotational encoders that detect wheel rotation, the bump sensors that detect physical contact with the robot 100 (e.g., at the bumper 120), the optical mouse sensor 133, the IMU 134, and the cliff sensors 121a-d. Some or all of the sensors of the sensor system 180 generate data related to features of structural elements in the environment, thereby enabling the navigation system 170 to determine a mode or behavior to use to navigate about the environment for complete coverage of a room or cell or for avoiding a potential hazard, such as a low overhang that would cause a wedged condition or a lamp base that would cause a beached condition. One or more of the various sensors of the sensor system 180 can be used to generate data related to one or more features or landmarks. The sensor system 180 creates a perception of the robot's environment sufficient to allow the robot 100 to make intelligent decisions about actions (e.g., navigation actions, drive actions) to take within the environment. The sensor system 180 gathers the data to allow the robot 100 to implement SLAM techniques, as will be described later.

The sensor system 180, instead of or in addition to the sensor types described above, and/or providing examples thereof, can include obstacle detection obstacle avoidance (ODOA) sensors, ranging sonar sensors, proximity sensors, radar sensors, LIDAR (Light Detection And Ranging, which can entail optical remote sensing that measures properties of scattered light to find range and/or other information of a distant target) sensors, clearance sensors operable with the clearance regulators 132a-b, a camera (e.g., volumetric point cloud imaging, three-dimensional (3D) imaging or depth map sensors, visible light camera and/or infrared camera), wheel drop sensors operable with the caster wheel 122c that can detect movement of the caster wheel 122c, or any combination thereof. The sensor system can also include communication sensors, navigation sensors, contact sensors, a laser scanner, and/or other sensors to facilitate navigation, detection of obstacles, and other tasks of the robot 100. The proximity sensors can take the form of contact sensors (e.g. a sensor that detects an impact of a bumper on the robot with a physical barrier, such as a capacitive sensor or a mechanical switch sensor), short-range optical sensors (e.g., infrared ranging sensors), and/or LIDAR sensors that detect when the robot is in close proximity to nearby objects.

The controller 190 operates the other systems of the robot 100 by communicating with each system, providing and receiving input and output parameters. The controller 190 facilitates communication between the power system 150, the cleaning system 103, the drive system 101, navigation system 170, the sensor system 180, and the memory storage element 195. For instance, the controller 190 can instruct the power system 150 to provide electrical power to the motors of the drive system 101 to move the robot 100 in the forward drive direction F. The controller 190 can also instruct the power system 150 to enter a power charging mode. The controller 190 can instruct the power system 150 to provide a specific level of power (e.g., a percent of full power) to individual systems.

The controller 190 can redirect the wheels 122a-b of the drive system 101 in response to, for example, signals received from the navigation system 170 and the sensor system 180. The controller 190 operates the navigation system 170 to maneuver the robot 100 in a path or route through the environment. The navigation system 170 can deliver instructions to the robot controller 190 to maneuver the robot 100 in any direction across the environment by independently controlling the rotational speed and direction of each wheel module 108a-b of the drive system 101. For example, the robot controller 190 can maneuver the robot 100 in the forward direction F, rearward direction A, right direction R, and left direction L. The robot controller 190 can maneuver the robot 100 to rotate substantially in place such that the robot 100 can maneuver away from or along an obstacle, wall, or other structural element of the environment. The robot controller 190 can direct the robot 100 over a substantially random (e.g., pseudo-random) path while traversing the floor surface or, in SLAM or VSLAM enabled robots, in a deterministic cleaning pattern.

Using the controller 190, the robot 100 can respond to events, such as contacting obstacles and walls within an area, detected by the bumper 120. A response can include using the navigation system 170 and drive system 101 to control the wheel modules 108a-b to maneuver the robot 100 in response to the event. The robot 100 can, for example, move away from an obstacle or along a path adjacent to the obstacle.

In some implementations, the controller 190 can include obstacle detection and avoidance methods and behaviors implemented in response to signals from bump sensors. The robot can use the bump sensors to detect the general location of an obstacle in the general vicinity of the robot 100 so that the robot 100 can determine the direction to turn to avoid the obstacle. Using the bump sensors (e.g., bump sensors disposed on the front portion of the robot 100), the controller 190 can determine when the robot contacts an obstacle and communicate instructions to the navigation system 170 and the drive system 101 to avoid the obstacle. When the robot 100 contacts an obstacle that triggers the bump sensors, in addition to determining when the robot 100 has contacted an obstacle, the controller 190 can further estimate an angle relative to the contact point between the robot 100 and the obstacle by calculating a time difference between the activation of two or more of the bump sensors, if two or more of the bump sensors are activated. The robot is then able to estimate the angle at which the robot approached the obstacle, e.g., the angle at which contact was made. For example, when the bumper 120 is activated from the right side, a rightward bump sensor detects the proximity of the obstacle first, followed by a leftward bump sensor. For example, when the bump sensors include mechanical switches, the rightward bump sensor activates first due to the compliance of the bumper 120 and the respective positions of the rightward and leftward bump sensors. In this way, the approach angle can be approximated with two bump sensors. The robot 100 can also use the obstacle following sensors 118 to estimate the angle that the robot 100 turns in order to move in a direction parallel to the obstacle. The obstacle following sensors 118 are time-of-flight sensors that can identify a distance from an obstacle. The controller (which will be described in more detail below) can respond to the data of the obstacle following sensors such that either of the lateral sides L and R of the robot 100 are a set distance from the obstacle as the robot 100 moves in the forward direction F.

As another example of obstacle detection and avoidance, optical sensors such as infrared ranging sensors can detect proximity of adjacent obstacles without, in some implementations, having to contact the obstacles. Based on the determined proximity, the robot 100 can re-orient to execute TRAJECTORY MAPPING behavior, as will be described in more detail below.

Control System Mapping and Localization Computation

To perform SLAM techniques, the memory storage element 195 can include modules that acquire data related to SLAM. For example, the memory storage element 195 includes a pose module 198a, a mapping module 198b, and a trajectory module 198c. Each module collects and stores data related to mapping the environment and localizing the robot 100 using detectable landmarks within the environment. As will be described for each module, the data generated by the modules includes data indicative of traveled unique trajectories within the environment that are recognizable landmarks (e.g., unique landmarks for re-localization), data indicative of a physical layout of the environment (e.g., occupancy grid), and data indicative of a calculated robot pose (e.g., estimated pose). The data can include odometry data from, for example, the encoders, the optical mouse sensor 133, and the IMU 134. The modules further can include pre-programmed data such as pre-loaded maps and landmark templates.

The control system 149 allows the robot 100 to estimate its pose in the environment using the pose module 198a. In one example, during execution of the pose module 198a, the controller 190 of the control system 149 implements a dead reckoning process to estimate the pose of the robot 100.

Referring briefly back to FIG. 1B, the controller 190 can use the encoders to track the distance traveled by the robot 100. The controller 190 can improve the accuracy of drift or wheel slippage associated with the dead reckoning data by incorporating an optical mouse sensor 133 and/or an IMU 134. The optical mouse sensor 133 estimates the drift in the x and y directions. The controller 190 can utilize sensed linear acceleration from the 3-axis accelerometer of the IMU 134 to estimate the drift in the x and y directions as well and can utilize the 3-axis gyroscope of the IMU 134 to estimate the drift in the heading or orientation θ of the robot 100. The controller 190 can therefore combine data collected by the rotary encoders, the IMU 134, and the optical mouse sensor 133 to produce improved estimates of the pose of the robot 100 at a given time.

Accurate over relatively short distances, dead reckoning is prone to drift over time. Drift errors can accumulate in dead reckoning measurements. Accumulated drift can affect both the distance computations and the heading computations. The controller 190 assigns an uncertainty value, a confidence value (inversely proportional to the uncertainty value), or an uncertainty covariance matrix, or some other value representative of the accumulated error for each pose that the controller 190 estimates using the pose module 198a. For example, as the robot 100 travels a farther linear distance, the controller 190 assigns an increasing uncertainty to the estimated (x, y) position of the robot 100, and as the robot 100 re-orients itself, the controller 190 assigns an increasing uncertainty to the estimated orientation θ of the robot 100. For each estimation of the pose, the estimation includes the position and orientation of the robot 100 as well as an uncertainty with the estimation. The robot 100 typically updates the estimation of its pose and the uncertainty in its estimation approximately every 10 milliseconds. In some implementations, the robot 100 updates the estimates after each occurrence of one or more events, such as after each observation of a landmark.

The mapping module 198b allows the controller 190 to generate a 2D grid of cells—an occupancy grid—to represent the physical layout of the environment. The occupancy grid generated includes data indicative of the physical layout of the area and represents both open areas and obstacles. The data indicative of the physical layout of the area can be understood to a virtual map of the physical layout. The occupancy grid includes a boundary of the environment and boundaries of obstacles therein, as well as the interior floor space traversed by the robot 100. As the robot 100 estimates its pose using the pose module 198a, the controller 190 determines and saves the grid coordinates of the robot 100 during its motion. The controller 190 further associates an uncertainty value with each pose. Each cell in the occupancy grid can be assigned a value indicating whether the cell is understood to be NON-TRAVERSABLE floor space or TRAVERSABLE floor space. Each cell of the grid can be assigned (x, y) coordinates based on a chosen origin (0, 0) cell in the environment. The chosen origin can be, for example, the charging dock of the robot 100 or a particular location in a room. Each cell can represent a square area with four sides. The sides of the cell coincide with the sides of other cells. The cells can have a side length between 1 and 100 cm. For example, the grid can be a grid of cells, each 10 cm×10 cm. Further details on occupancy grid-based mapping and re-localization techniques that can be implemented by the controller 190 can be found in U.S. Pat. No. 9,630,319, the entirety of which is incorporated by reference herein.

As the robot 100 navigates, the robot 100 can store both absolute position data (e.g., (x, y) coordinates of each coordinate and/or cell traversed by the robot 100) and local position data. The local position data need not be in reference to an absolute origin but, rather, describes movement of the robot 100 relative to a starting point that can be arbitrarily selected or that can correspond to a pre-stored landmark. The local position data can also include a position-dependent curvature, which characterizes how tightly the robot 100 turns during traversal of a trajectory. The curvature can be calculated as the reciprocal of the robot's instantaneous turning radius, e.g., as determined based on data provided by the wheel encoders, the optical mouse sensor 133, and/or the IMU 134. A straight-line trajectory has a curvature of 0 over its entire length, an exactly circular trajectory has a constant curvature, and an irregular trajectory has a fluctuating curvature.

Robotic Behaviors

The memory storage element 195 further includes behaviors for the robot 100 that cooperate with the modules 198a-198c to perform SLAM techniques. The controller 190 can execute behaviors that implement one of or combinations of the modules and use the data collected by the modules to identify landmarks, store trajectories corresponding to the landmarks, and re-localize the robot 100 to the map of the environment. The behaviors include TRA- JECTORY MAPPING behavior, COVERAGE behavior, and RE-LOCALIZATION behavior.

1. TRAJECTORY MAPPING Behavior

In general, during TRAJECTORY MAPPING, the robot 100 detects a wall, obstacle (e.g., furniture, breakfast bar, cabinet toe kick, etc.), or other structure (e.g. fireplace hearth, stair edge, etc.) in the environment (collectively referred to as "environmental features") using the bumper 120 or another sensor, follows the contours of the environmental feature, and then proceeds to generate a trajectory using the trajectory module 198c corresponding to data collected as the robot 100 follows part or all of the environmental feature. The data collected can represent a feature or landmark from the pose module 198a. In some examples, the robot 100 implements the obstacle following sensors 118 to perform the TRAJECTORY MAPPING behavior. Upon initial contact with an environmental feature, the robot 100 can rotate until the robot 100 is oriented such that the forward drive direction F of the robot 100 is parallel with a surface of the environmental feature. In some cases, environmental feature can be curved such that the robot 100 follows a curved path as it move along the surface of the environmental feature. In such examples, the robot 100 can be oriented such that it is tangential to the surface of the environmental feature.

Using the bumper sensor, the controller 190 can implement TRAJECTORY MAPPING behavior, where the robot 100 can make physical contact with an environmental feature (or otherwise become close to the environmental feature, such as by using a short-range infrared sensor) and re-orient the robot 100 such that the forward drive direction F of the robot 100 is parallel or tangential to the surface of the obstacle. The TRAJECTORY MAPPING behavior allows the robot 100 to follow a path corresponding to the edges/perimeter of the environmental feature. For example, as described earlier, the controller 190 can interpret a time difference between actuation of right and left bump sensors to determine a contact angle with the obstacle. The contact angle provides an estimate of the amount that the robot 100 needs to turn in order to align its forward drive direction F with the environmental feature. The controller 190 can instruct the robot 100 to turn a fraction of the required turning angle and then continue in the forward drive direction F. Contacting the environmental feature again triggers the bump sensors. The controller 190 can then estimate the new contact angle and continue adjusting the orientation of the robot. Once the contact angle is below a certain amount, the controller 190 can instruct the robot to turn the full angle so that the forward drive direction F is parallel to the environmental feature. Obstacle following sensors 118 such as infrared sensors, and/or other sensors such as the sensors described above, can instead or additionally be used for this purpose. The robot then proceeds to follow the environmental feature in the TRAJECTORY MAPPING behavior. In some implementations of the TRAJECTORY MAPPING behavior, the controller 190 uses the obstacle following sensors 118 to determine at what orientation to stop rotating the robot 100. When the obstacle following sensors determine that the side of the robot 100 is substantially parallel to the environmental feature, the controller 190 ceases rotation. In some implementations, the controller 190 uses the obstacle following sensors to determine the orientation of the robot 100 that will cause the robot 100 to have a forward drive direction substantially tangential to the surface of the environmental feature. In the case of curved surfaces, the controller 190 can use the tangential orientation to allow the robot 100 to follow along curve surface (e.g., cylindrical columns, curved walls, floor lamps, or other environmental features having curved footprints).

Mapping of each trajectory begins with the controller 190 "anchoring" a start position (an "anchor") of the trajectory. The robot 100 then proceeds around a perimeter of an environmental feature, as described above, until the controller 190 determines that an end trajectory condition is satisfied. Examples of possible end trajectory conditions include: the environmental feature ends; the robot 100 returns to the anchored start position during the obstacle-following, and determines that its position is the anchored start position; or the robot 100 traverses a threshold distance during the trajectory. For example, in some implementations the threshold distance is 2.5 meters. When an end trajectory condition has been satisfied, the controller 190 determines whether to save the trajectory as a landmark, as described in more detail below.

Figure 2:
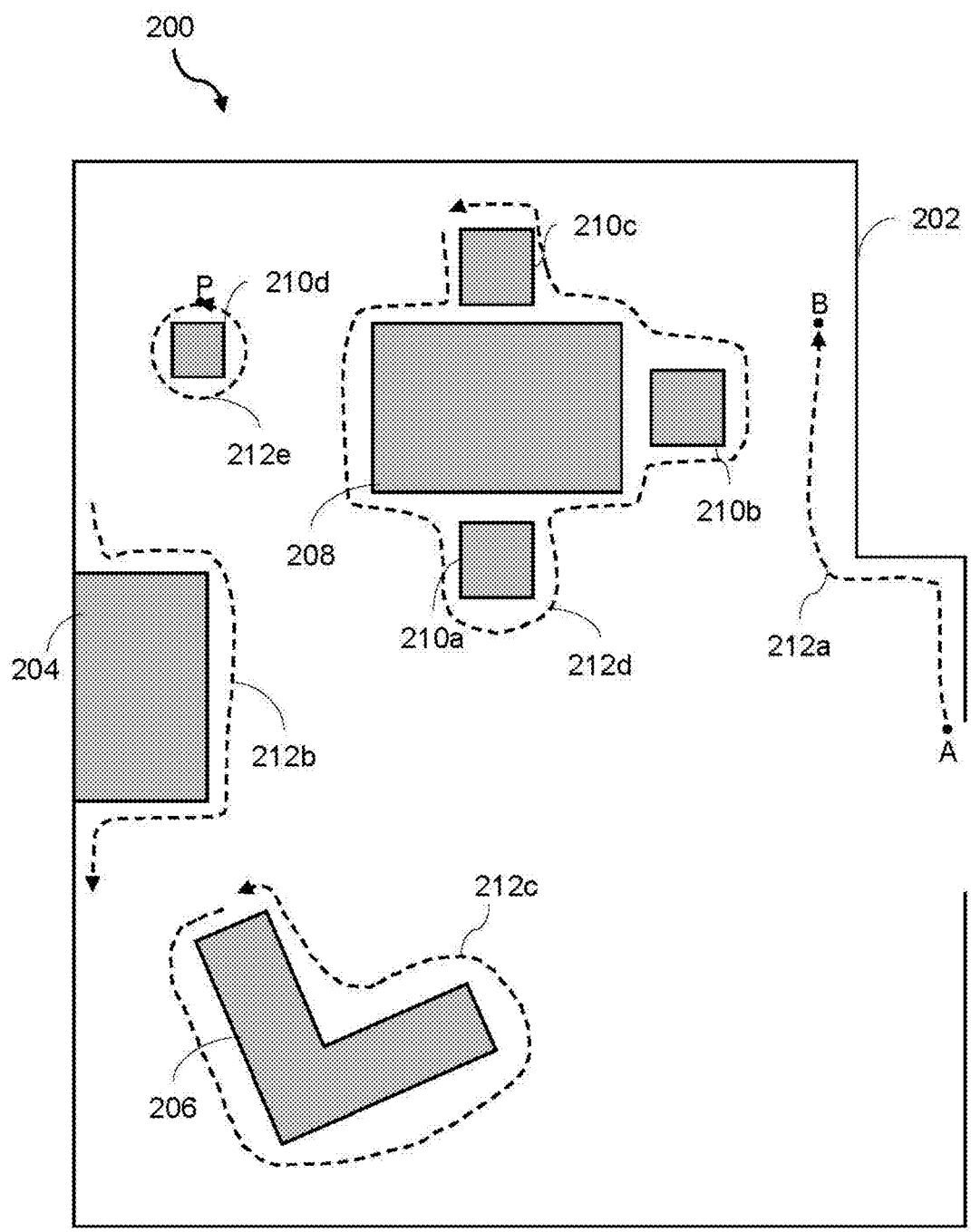
FIG. 2 shows an environment including example trajectories.

As shown in FIG. 2, an environment 200 includes environmental features such as walls 202, a bookshelf 204, furniture 206, a table 208, and chairs 210a, 210b, 210c, 210d. During TRAJECTORY MAPPING behavior performed over one or more missions, the robot 100 navigates around perimeters of each environmental feature and obtains trajectories 212a, 212b, 212c, 212d, and 212e. Some trajectories, such as trajectories 212c, 212d, and 212e, are closed-looped trajectories, while trajectories 212a and 212b are open trajectories. The controller 190 can implement a decision process to classify trajectories as closed-loop or open. For example, the controller 190 can test whether a trajectory starts and stops at the same point, as for point P in trajectory 212e, or whether the trajectory includes its anchor point. In some implementations, to account for drift, the controller 190 tests whether a start point and an end point (or another point) of the trajectory are within a threshold distance from one another. Poses along the trajectories are provided by the pose module 198a and, accordingly, positions of the trajectories are associated with corresponding confidences. These confidences can be incorporated into the decision process for trajectory type classification. For example, in some implementations, the controller 190 tests whether a trajectory starts and stops at the same point with a threshold confidence level based on confidence levels of pose estimates corresponding to first and second times at which the robot 100 was at the point or within a threshold distance of the point.

As processed and stored by the controller 190, a trajectory landmark is a set of data characterizing the path traveled by the robot 100 over a given segment of time. In some implementations, the trajectory landmark includes one or more sets of coordinates (e.g., (x, y) coordinates, in some cases including angular pose information) of each pose determined by the pose module 198a during traversal of the trajectory. These coordinates can be absolute coordinates (e.g., relative to an origin point of the environment) and/or can be relative to the anchor point at which the trajectory starts. Relative trajectory calculation can be useful because it more easily allows for trajectory-to-trajectory comparisons without having to "zero" one or both of the trajectories in question. For example, point A in FIG. 2, which is the anchor point of trajectory 212a, is point (0, 0) in a local coordinate system used for storage of local position information for trajectory 212a. Coordinate data and other data characterizing trajectories can be obtained by obstacle following sensors 118 such as infrared sensors, bump sensors, and/or other sensor types, by the optical mouse sensor 133, by the inertial measurement unit (IMU) 134, by rotational encoders tracking wheel movement, and/or by other types of sensors integrated into the robot 100.

Besides positional coordinates, trajectory landmarks can instead or additionally include instantaneous navigation information such as instantaneous turning radius, instantaneous curvature, instantaneous speed/velocity, instantaneous travel direction, and/or other data characterizing the robot's relative movements. In some implementations, trajectory landmarks include a time that the robot 100 took to traverse the trajectory, e.g., from the anchor point to the end point. Because traversal time (as based on, for example, traversal speed) depends on environmental feature characteristics as described in more detail below, traversal time and/or velocity can be useful for determining whether two trajectories match. Data in the trajectory landmark can be stored as a function of distance traveled (e.g., characterizing the robot 100 once for each distance interval traveled, such as every 1 cm), and/or can be stored as a function of time (e.g., characterizing the robot 100 once for each time interval passed, such as every 10 milliseconds or every 100 milliseconds). In some implementations, trajectory landmarks include or are associated with a time of generating the trajectory landmark, e.g., so that the controller 190 can determine which trajectory landmarks are newer/older than others.

TRAJECTORY MAPPING behavior can be performed based on various timings and triggers, such as, for example, on a periodic basis (e.g., every 2 hours), before performing a cleaning mission and/or after performing a cleaning mission, when the robot is idle without instructions to perform a different task such as cleaning, and/or while performing other behavior, such as cleaning. For example, if, during a cleaning mission, the robot navigates around a perimeter of an obstacle in order to reach a target location, the robot can use that opportunity to map the trajectory around the perimeter and determine whether to store the trajectory as a trajectory landmark.

2. Landmark Selection

Although, in some implementations, the robot 100 is continuously tracking its trajectory, not every trajectory segment is ultimately stored as a landmark. Too-high densities of landmarks can potentially impede future mapping/re-localization. For example, without landmark selection restrictions, a single environmental feature (e.g., a single object in a room) may be landmarked several times, each landmark corresponding to a trajectory around a different portion of the environmental feature. This can cause re-localization confusion if the environmental feature subsequently shifts and/or rotates in position, because the several landmarks corresponding to the environmental feature will shift/rotate together and may collectively be analyzed to infer incorrect mapping information. In addition, high landmark counts can increase processing loads and/or processing time.

Accordingly, after measurement of a trajectory, various trajectory parameters are analyzed (e.g., by the controller 190) to determine whether the trajectory is stored as a landmark. In various implementations, this selection process can be based on one or more of various considerations, including the following examples:

Uniqueness: A local positional characterization of the new trajectory is compared to each previously-stored trajectory to confirm that the new trajectory is sufficiently different from each previous trajectory. This consideration can be different from minimum-spacing considerations, because it can prevent trajectory "copies" from being stored even when the copies correspond to separate real-world environmental features. For example, if two copies of a table are arranged in different locations in an environment, the controller 190 can determine not to store a second trajectory of the second table if a first trajectory of the first table has already been stored. If both trajectories are stored, the robot may, during re-localization, identify the first trajectory as the second trajectory, or vice-versa, and infer incorrect absolute positional information. Accordingly, the controller 190 calculates a similarity between the new trajectory and previous trajectories (e.g., using a curve-matching algorithm such as Wolfson's curve-matching algorithm, and/or based on a trajectory similarity/distance metric, as described in more detail below) and determines whether the new trajectory satisfies a similarity condition, such as having less than a threshold similarity with each previously-stored trajectory. This calculation can take into account arbitrary rotation so that too-similar new trajectories are discarded even if the new trajectories are rotated compared to the previous trajectories.

In some implementations, the controller 190 searches for matching previously-stored trajectories by using a curve-matching algorithm such as Wolfson's curve matching algorithm (Wolfson, "On Curve Matching," *IEEE Transactions on Pattern Analysis and Machine Intelligence*, vol. 12, issue 5) or another curve-matching algorithm. Some examples of these algorithms search for matching sub-segments of the two trajectories. Searching for matching sub-segments can provide improved performance compared to matching entire trajectories, because in general the robot will not traverse around a given environmental feature starting from the same anchor point or for the same total length. The curve-matching algorithm searches for longest matching sub-segments of the two trajectories. For example, the algorithm can search for one or more matching sub-segments that satisfy criteria, such as one or more of: at least a minimum length (e.g., 0.75 m); matching turn radii (1/curvature), such as turn radii that differ by less than 0.75 m; low distances between corresponding points in the final match between sub-segments (e.g., less than 0.1 m error between corresponding points); and not too line-like (e.g., sub-segments that have at least a minimum number of points, such as 20 points, more than a minimum distance, such a 0.2 m, from a best-fit line drawn to the sub-segments).

A similarity/distance metric between two trajectories can be based on at least partly on a length of matching sub-segments of the trajectories and/or on a number of distinct matching sub-segments having a minimum length. If no matching sub-segments are identified, then the trajectories are highly dissimilar from one another, e.g., the similarity is 0. More matching sub-segments, and/or longer matching sub-segments (e.g., a length of a longest matching sub-segment) correspond to higher similarity metrics/lower distance metrics between the trajectories. In some cases, similarities between identified matching sub-segments (e.g., as determined by a curve-matching algorithm) can be calculated and used to at least partially characterize similarities of trajectories. For example, a similarity between the matching sub-segments can be calculated using a Euclidian distance, a Frechet distance, a dynamic time warping-based distance, an edit distance, a one-way distance, and/or another distance type. A lower distance between matching sub-segments corresponds to a higher similarity between trajectories. Alternatively, or in addition, any one or more of these distance metrics can be applied to entire trajectories as opposed to identified matching sub-segments of the trajectories, as a sole factor or additional factor in determining inter-trajectory similarities. Curve matching and similarity determination can take into account transforms (e.g., translations and/or rotations) between trajectories, e.g., to account for drift. Curve matching and similarity determination can be performed after alignment of coordinate systems of the trajectories, such as alignment of the trajectories such that anchor points of the trajectories are aligned in a common reference frame.

The aforementioned curve-matching and similarity determination methods need not be applied specifically to coordinates (e.g., x, y, and/or θ coordinates). Rather, in some implementations the trajectories are compared using other features of the trajectories, such as curvatures of the trajectories. For example, plots of curvature v. distance can be aligned with one another to provide the best overlap with one another (e.g., using Wolfson's curve-matching algorithm on the curvatures themselves), and similarities of the curvatures can define whether a match is or is not present between the trajectories, and/or quantify an extent of the match.

In addition, these curve-matching and similarity determination methods are not restricted for use in identifying a uniqueness of a new trajectory. Rather, these methods can be applied whenever curve-matching and/or trajectory similarity determination are performed during robot operations, as described throughout this disclosure.

Straight-line test: All straight lines look alike save for relative rotation, presenting inherent problems for trajectory identification. Moreover, it can be difficult to differentiate between different locations on the same line. Accordingly, in some implementations, straight-line trajectories (e.g., corresponding to straight, generally-featureless walls) are discarded. A metric of straightness of the trajectory is calculated, and the trajectory is discarded (not stored as a landmark) if the metric of straightness is above a threshold value. For example, the positional data of the trajectory is fit to a best-fit line, and it is determined whether a threshold number of points on the trajectory (e.g., 50) are at least a minimum distance (e.g., 20 cm) from the best-fit line. If not, the trajectory is determined to be a straight-line trajectory and is discarded.

Landmark density: In some implementations, a new trajectory is discarded if it is too close to any other landmark. For example, a new trajectory can be discarded if the new trajectory is less than a threshold distance (e.g., 30 cm) from a previously-stored landmark. This can help reduce a number of stored landmarks and reduce the chance of storing multiple different trajectories corresponding to the same environmental feature, for the reasons provided above.

Minimum distance: Too-short landmarks can be too generic or present difficulties in matching/transform operations. Accordingly, in some implementations, only trajectories of at least a minimum length can be stored as landmarks. For example, a new trajectory can be discarded if the new trajectory is less than a threshold length, such as 1.5 m.

Minimum speed: The speed with which the robot traverses around an environmental feature can be determined by, among other parameters, a size of the feature (e.g., a height of the feature that allows or disallows the use of one or more sensors to detect the feature), a straightness of the perimeter of the feature (e.g., requiring more or less turning/re-orientation), and/or a physical composition of the feature (e.g., presenting more or less resistance to bumper sensors). Slowly-traversed trajectories will consume more navigation time if subsequently used for re-localization, which may be undesirable. Also, slowly-traversed trajectories tend to correspond to types of obstacles that are less reliable for re-localization, such as objects that are often moved or that are impermanent (e.g., especially mobile furniture or piles of clothing and other messes). Accordingly, in some implementations, a speed of the robot while traversing the trajectory is determined (e.g., an average speed), and the trajectory is discarded if the speed does not satisfy a threshold condition. For example, in some implementations, the trajectory is discarded if the average speed is less than 70 mm/s.

Maximum time: For similar reasons to those given in discussing "minimum speed" considerations, it can be desirable to exclude trajectories that take a long time to traverse. Accordingly, in some implementations, a trajectory is discarded if the time taken to traverse the trajectory does not satisfy a threshold condition. For example, in some implementations, the trajectory is discarded if its total traversal time is over 30 seconds.

Clutter status: As described in further detail below, non-wall environmental features having non-straight trajectories or certain other trajectory characteristics ("clutter") can be more useful for re-localization than walls, and in particular more useful than straight walls. Accordingly, in some implementations, a trajectory is more likely to be stored as a trajectory landmark if the controller 190 has classified the trajectory as corresponding to clutter. In some implementations, regardless of clutter or non-clutter status, a trajectory is more likely to be stored as a trajectory landmark if the controller 190 determines that the trajectory is not straight, e.g., is curved and/or includes corners (including curved walls or walls with corners).

Ambiguity/self-matching: Re-localization is performed using trajectory-to-trajectory transforms, as described in more detail below. However, some trajectories can be successfully mapped to/from with multiple different transforms, introducing ambiguity into the transform-determination process. For example, a circle is transformed into a transformed circle with the same heading (rotation level) regardless of a level of rotation in the transform, and a trajectory having reflection symmetry is transformed into a transformed trajectory with the same heading using two different transforms corresponding to reflection about the trajectory's axis of symmetry. To reduce occurrences of incorrect/ambiguous transform determination, in some implementations the controller 190 identifies (e.g., searches for) transforms that transform a new trajectory to itself. An ideally non-ambiguous trajectory should have only one self-matching transform, the identity transform (e.g., a 3×3 or 4×4 matrix having 1s in its diagonal and 0s elsewhere). By contrast, for example, a circular trajectory is transformed into itself by any rotational transform.

In practice, a real-world trajectory is unlikely to map to itself exactly; accordingly, in some implementations the controller 190 identifies transforms that transform a new trajectory to itself within some level of quantified similarity/distance metric. If a transform (besides the identity transform or minor variations thereof) is identified that transforms a new trajectory into itself within a threshold distance/error, the new trajectory is determined to be ambiguous and is discarded. In some implementations, an ambiguity metric is determined as a function of a number of transforms (excepting minor variations thereof) that map a trajectory to itself, and/or as a function of one or more similarities between the trajectory and one or more trajectories obtained after applying one or more non-identity transforms. This process tends to select for asymmetric/irregular trajectory shapes. A transform-determination method such as the Kabsch algorithm can be used to identify candidate transforms for transforming trajectories into themselves, as described in more detail below.

Location type avoidance: In some implementations, the controller 190 analyzes a new trajectory to determine whether the trajectory intersects any of various types of location. For example, the controller 190 can determine whether the trajectory intersects a virtual wall (e.g., a virtual wall programmed by a user), a robot dock, a cliff, a hazard, or another location that may introduce difficulties for robot navigation. If so, in some implementations the controller 190 discards the new trajectory instead of storing it as a landmark.

Although the aforementioned considerations for trajectory landmark selection have been described in binary terms of "discard" or "do not discard (and store as landmark)" in some implementations a more holistic process is used to determine whether a new trajectory is stored as a landmark. For example, in some implementations the controller 190 determines values that characterize two or more of the trajectory's uniqueness, straightness, distance to existing landmarks, length, traversal speed, traversal time, clutter status, ambiguity, or location type intersections, and the controller 190 can determine whether to store the trajectory as a landmark based on the two or more values together. For example, the controller 190 can use the two or more values in a weighted determination process (e.g., a weighted summation) and use a result of the weighted determination process (e.g., in comparison to a threshold value) to determine whether to store the trajectory as a landmark. As another example, the controller 190 can input the two or more values into a machine learning model that has been trained to identify which trajectories are more/less useful for re-localization, and the machine learning model produces, as output, a determination of whether the trajectory is stored as a landmark. As a result, for example, in some implementations even a moderately-ambiguous trajectory will be stored if the trajectory is fast to traverse and is highly unique compared to existing trajectory landmarks.

As noted above and throughout this disclosure, as a result of trajectory-based landmark generation, the robot 100 can re-localize using not only walls (e.g., straight walls) but also furniture, storage bins, and other movable or non-movable items besides walls, collectively referred to as "clutter." Trajectories/landmarks can be classified as corresponding to walls or clutter, and can be correspondingly treated differently during re-localization, as described in more detail below. In some implementations, the controller 190 performs a classification process to classify landmarks as "clutter" or "wall," and the landmarks can correspondingly be stored in association with, or including, a value indicating the classification. For example, the controller 190 can determine whether a trajectory is closed-loop or open (as described above), and, if the trajectory is closed-loop, the controller 190 classifies the landmark as a clutter landmark. Because the robot, during TRAJECTORY MAPPING behavior, is aware of its position relative to an environmental feature being navigated around, the robot can further discern whether a closed-loop trajectory is around an exterior of the environmental feature (e.g., circumnavigating furniture), which is indicative of a clutter landmark, or whether the robot completes the loop inside an environmental feature (e.g., such that the environmental feature encloses the loop instead of vice-versa), which is indicative of a non-clutter landmark such as a wall. In some implementations, a trajectory need not be entirely closed-loop to indicate a clutter landmark. For example, a full circuit around an item of clutter may be 3 meters, but the robot stops navigation of a trajectory after 2.5 meters. However, the robot can use the measured trajectory data in a decision process to identify that the trajectory corresponds to clutter, e.g., based on a relative distance of the anchor point and the trajectory end point, based on the trajectory positional data (e.g., a shape formed by the trajectory positional data), based on curvature(s) of the trajectory (e.g., with higher average curvature indicating that the robot is completing a loop around the clutter, as opposed to navigating alongside a wall), or a combination of these and/or other factors.

In some implementations, the controller 190 is configured to update the clutter/wall classification based on newly-acquired information. For example, if the controller 190 identifies (e.g., with a minimum level of confidence, as determined based on positional confidences included in pose estimates provided by the pose module 198*a*) that a new trajectory corresponds to the same environmental feature as a previously-stored trajectory (e.g., based on a similarity of the trajectories), but that the environmental feature has been translated and/or rotated compared to when the previously-stored trajectory was traversed, the controller 190 can classify the previously-stored trajectory's landmark as a clutter landmark, because clutter, unlike walls, can be moved within an environment.

2. COVERAGE Behavior

By way of general overview, COVERAGE behavior instructs the robot 100 to cover and clean the floor of the environment. The robot 100 can cover the floor surface of the environment using coverage path techniques known in the art, such as a boustrophedon or cornrow pattern, a spiral pattern, or a pseudo-random bounce coverage. As the robot 100 covers the floor, the controller 190 can implement the pose module 198*a* and the mapping module 198*b* to estimate the pose of the robot 100, generate a map (e.g., an occupancy grid), and estimate the uncertainty of the pose estimations. The coverage pattern can be one in which the robot is navigated to cover the area in sequential passes in which each subsequent pass follows an edge of a region cleaned on a previous pass (e.g., as a spiral or a cornrow pattern), rather than a pseudo-random bounce pattern.

As the robot 100 navigates the environment in COVERAGE behavior, the uncertainty of the controller 190 (shown in FIG. 1C) in the pose of the robot 100 may increase over time or distance travelled. If the uncertainty covariance computed by controller 190 increases to above a pre-determined threshold overall or individually in the x, y, or theta direction, the controller 190 can disable the mapping module 198*b* that modifies and updates the map. The pre-determined threshold for uncertainty can be, for example, relative to the diameter of the robot in the x-y direction. The pre-determined threshold may be based on the standard deviation or covariance of the position of the robot. For example, since units of the standard deviation are the same as the units of the position of the robot, the pre-determined threshold can be computed based on the diameter of the robot. In some cases, the thresholds of a covariance matrix of the uncertainty can be set to a value relative to the diameter of the robot and the narrowest expected corridor or doorway in order to ensure the robot can properly navigate to any given landmark to re-localize. Exceeding the pre-determined threshold can cause the controller 190 to disable COVERAGE behavior and the mapping module 198*b*. As a result, the map of the mapping module 198*b* can become frozen in the last known-good state and remains that way until the robot 100 is able to reduce uncertainty in its pose, at which time the controller 190 may resume adding map data to the mapping module 198*b*. In some implementations, the robot 100 will shift the map, or portions/environmental features thereof, to align with reliably re-encountered landmarks.

3. RE-LOCALIZATION Behavior

When the pose uncertainty of the robot 100 increases above the pre-determined threshold, the controller 190 can implement the RE-LOCALIZATION behavior to reduce the uncertainty of the pose estimate and to generally compute a correction for the pose of the robot 100. The RE-LOCALIZATION behavior can be used by a SLAM process to correct for drift in the dead reckoning information.

Upon initializing the RE-LOCALIZATION behavior, the controller 190

(i) selects a trajectory landmark found in the trajectory module 198*c* to use for re-localization;

(ii) directs the robot 100 to the suspected physical location of the trajectory landmark;

(iii) traverses a new trajectory corresponding to the trajectory landmark;

(iv) identifies a match between the new trajectory and the trajectory landmark;

(v) determines a transform between the new trajectory and the trajectory landmark; and (vi) using the transform, adjusts the pose estimate of the robot to re-localize the robot 100 to the environment.

The controller 190 can consider a number of factors to select a landmark to use for re-localization. For example, the controller 190 can compute the suspected distance—for example, the geodesic distance or the navigable distance—between the current estimated location of the robot 100 and the locations of the nearest landmarks and select the landmark at the shortest distance. The controller 190 can consider the duration of time that has elapsed since the controller 190 has recorded each landmark and select the most recently recorded landmark.

The controller 190 can further consider the uniqueness of each landmark compared to other landmarks and select the most unique of the landmarks. Uniqueness can be measured by determining pairwise distance/similarity metrics between stored trajectory landmarks and identifying which trajectory landmarks have high similarities with one or more other landmarks and/or which trajectory landmarks have sufficiently high similarities (e.g., above a threshold similarity) with more landmarks than do other trajectory landmarks.

In some implementations, the controller 190 considers lengths of landmarks, times landmarks take to traverse, or both. Spatially-long landmarks, when used for re-localization, can cause the robot to end up far from the robot's original location, in some cases necessitating further backtracking by the robot to return to its previous location. Landmarks that take a long time to traverse consume greater time-budget, delaying behaviors such as cleaning, performing further mapping, and returning to a dock to recharge. Accordingly, the controller 190 can select for shorter trajectory landmarks over longer trajectory landmarks.

In some implementations, the controller 190 keeps track of past successes/failures when using each landmark for re-localization. For example, a "success" can be a re-localization in which a newly-traversed trajectory is matched with the landmark and used for transform-based pose correction. A "failure" can be a failure in navigating to the landmark, a failure in identifying a match, or a failure in calculating a transform between a newly-traversed trajectory and the landmark. Repeated failures for a landmark (e.g., failures above a threshold failure count) can result in deletion of the landmark. Past failures for an existing landmark can cause the controller 190 to be less likely to select the landmark, and past successes can conversely cause the controller 190 to be more likely to select the landmark.

In some implementations, the controller 190 selects a landmark at least partially based on a relative uncertainty of the robot in a given direction. Some landmarks do not provide equal pose correction in every direction. For example, a trajectory along a straight wall can be used to correct pose direction perpendicular to the wall, but not parallel to the wall. Even when a transform might theoretically be expected to provide pose correction in every direction (including a heading correction), uncertainties in one or more directions might decrease the usefulness of the transform in one or more of the directions, e.g., as indicated by a covariance matrix of transform uncertainty. Accordingly, in some implementations the controller 190 determines to what extent stored landmarks can be re-traversed to correct in various directions, and the controller 190 selects a landmark for re-localization based on current needs given current pose uncertainties. For example, if the uncertainty is above a threshold value in the x direction, the robot might select a landmark which will reduce the uncertainty in that direction, such as a wall that is orthogonal to the x direction. In some implementations, the controller 190 selects a landmark that will best reduce uncertainty along the major axis of an ellipse corresponding to the uncertainty covariance matrix. Specifically, the rotation and lengths of the axes of the ellipse are determined based on eigenvectors and eigenvalues of a 3×3 uncertainty covariance matrix, and the major axis corresponds to the direction of most uncertainty.

In some implementations, the controller 190 is more likely to select a landmark that has been classified as "clutter" and/or that is curved/non-straight. This can allow for improved (e.g., more accurate) re-localization and/or re-localization along multiple coordinates, such as along each of two positional coordinates and heading coordinates (e.g., x, y, and θ (heading)), for the reasons provided below.

In some implementations, two or more of these and/or other considerations are taken into account by the controller 190 when selecting which landmark to use for re-localization. For example, in some implementations the controller 190 determines values that characterize two or more of landmark's uniqueness, current distance from the robot, recency of creation of the landmark, spatial and/or temporal length of traversal of the landmark, past successes/failures in using the landmark for re-localization, or extents to which the landmark can reduce uncertainty of the pose (e.g., correct the pose) in different directions, and use two or more of the values to select a landmark. For example, the controller 190 can use the two or more values in a weighted determination process (e.g., a weighted summation) and use a result of the weighted determination process (e.g., in comparison to a threshold value) to determine which landmark to use for re-localization. As another example, the controller 190 can input the two or more values into a machine learning model that has been trained to identify which landmark will be most useful for re-localization, and the machine learning model produces, as output, a determination of which landmark to use for re-localization.

After selection of a landmark, the robot controller 190 can use a path planning algorithm known in the art—such as the A* algorithm or Dijkstra's algorithm—to direct the robot 100 to the suspected physical location of the landmark. These algorithms allow the robot 100 to avoid structures or walls that may intervene between the landmark and the current position of the robot 100. For example, the robot 100 can attempt to maneuver to an anchor point of the landmark (a beginning point of the stored trajectory of the landmark).

In some implementations, for a trajectory landmark that is not a straight line (e.g., not corresponding to a straight wall), an initial portion of the trajectory landmark, or another set of locations corresponding to the initial portion, is designated as a "runway." When the robot 100 navigates to the landmark to re-localize, the robot 100 attempts to navigate to the runway, using the runway as a set of locations at which to engage with the corresponding environmental feature. In some implementations, the runway is excluded from subsequent curve-matching/trajectory-comparison, to allow for the increased difficulty of re-engaging with a non-straight trajectory. A runway can be defined, for example, as a line segment defined by the anchor point and a point a defined distance along the trajectory, such as 30 cm.

Upon reaching an estimated location of the landmark (e.g., the anchor point of the landmark), the robot 100 executes TRAJECTORY MAPPING behavior to follow the geometric contours at the estimated location and to generate a new trajectory corresponding to these sensed contours. For example, the robot 100 uses bumper sensors, infrared sensors, and/or other sensors to follow a perimeter of an environmental feature adjacent to the robot. As a result, the robot 100 generates a new trajectory. The new trajectory can be terminated upon reaching a predetermined length, after a predetermined time period of traversal, when the new trajectory is determined to form a closed loop, or at another point. Coordinate data and other data characterizing trajectories during re-localization can be obtained by obstacle following sensors 118 such as infrared sensors, bump sensors, and/or other sensor types, by the optical mouse sensor 133, by the inertial measurement unit (IMU) 134, by rotational encoders tracking wheel movement, and/or by other types of sensors integrated into the robot 100.

The robot 100 tests whether the new trajectory is a match for the selected trajectory landmark being used for re-localization. A match failure can be indicative of significant pose error, modification of an environmental feature, difficulties in navigating to or at the trajectory landmark, or another navigational fault. Upon identifying a match failure, the controller 190 can select a new landmark to be used for attempted re-localization. The controller 190 determines whether the new trajectory and the trajectory landmark match based on a trajectory-similarity determination as described above, using spatial trajectory coordinates and/or curvature data. For example, matching sub-segments of the trajectories can be identified and used to determine a similarity metric. If the similarity metric is above a threshold value, the trajectories are determined to match.

Figure 3A:
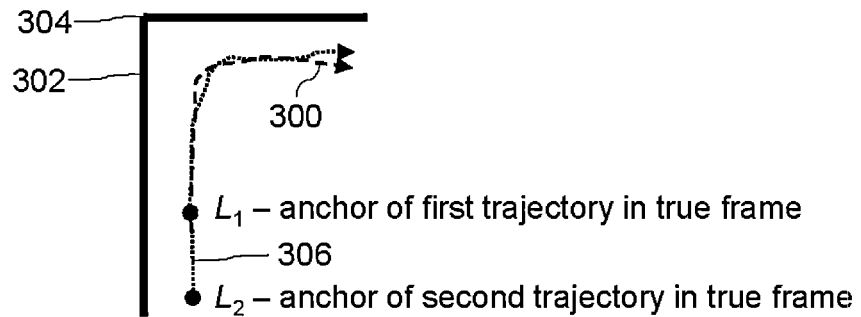
FIG. 3A shows two example trajectories in a true reference frame.

If the trajectories are determined to match, the robot 100 determines a transform between the new trajectory and the stored trajectory landmark. An example of this process is shown in FIGS. 3A-3D. As shown in FIG. 3A, a first trajectory 300, having anchor $L_1$, is a trajectory landmark being used for re-localization. The first trajectory 300 corresponds to traversal around a wall 302 having a corner 304. During RE-LOCALIZATION behavior, the robot attempts to navigate to $L_1$ but, because of accumulated drift, begins a second trajectory 306 at a different anchor $L_2$. The second trajectory 306 eventually generally overlaps with the first trajectory 300 but has an overall longer length.

Figure 3B:
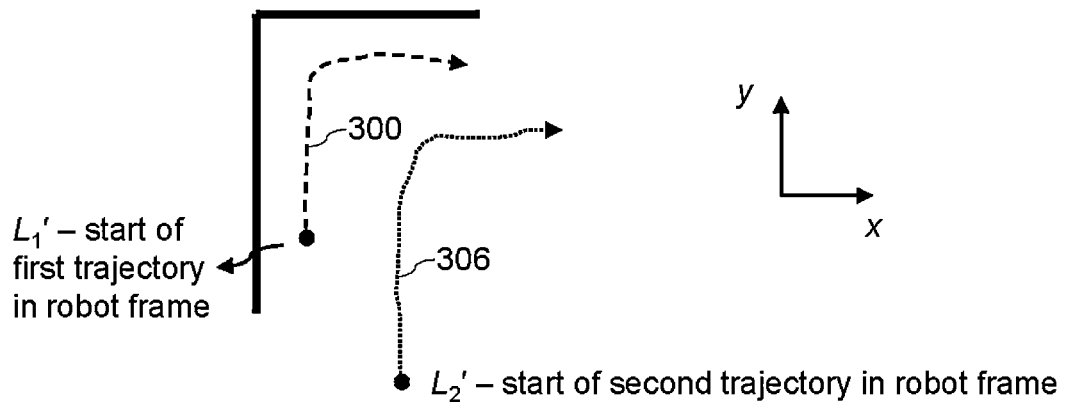
FIG. 3B shows the two example trajectories of FIG. 3A in a robot's reference frame.

FIG. 3A is shown in a real-world reference frame. FIG. 3B shows the same trajectories 300, 306 in the robot's reference frame. Because of accumulated drift, spatial coordinates of the second trajectory 306 are shifted in both x and y directions compared to corresponding coordinates of the first trajectory 300. Equivalently, poses generated by the robot during traversal of the second trajectory 306 have error in both x and y directions. In the robot's reference frame, the anchor of the first trajectory 300 has coordinate $L_1'$, and the anchor of the second trajectory 306 has coordinate $L_2'$.

Figure 3C:
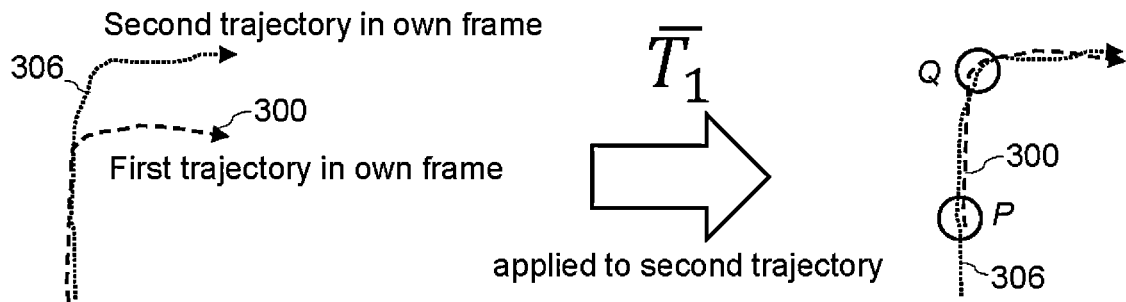
FIG. 3C shows alignment of the two example trajectories of FIG. 3A.

Each trajectory 300, 306 can also be represented in its own local reference frame, as shown in FIG. 3C. In the local reference frame of a trajectory, the anchor of the trajectory is (0, 0), such that, when the local reference frames and trajectories therein are overlaid, as in FIG. 3C, the anchors coincide. A transform $T_1$ is determined that best aligns the second trajectory to the first trajectory in the local reference frame. In some implementations, the transform $T_1$, and identification of matching point pairs therein as described below, is determined as part of the determination of whether the trajectories 300, 306 match one another. For example, as part of a curve-matching and/or similarity-determination process, a shift in one or more coordinates that provides the best trajectory sub-segment overlap can be used as the transform $T_1$ to provide the overlap between the trajectories 300, 306 in the local reference frame. The transform $T_1$ need not be a spatial transform, e.g., a spatial transform in the coordinates of the local reference frame. Rather, in some implementations the transform $T_1$ can be, for example, a shift forward or backward in a one-dimensional representation of a trajectory, such as a curvature v. length representation.

Using the second trajectory 306 transformed by the transform $T_1$, the controller 190 determines one or more pairs of corresponding points between the first trajectory 300 and the second trajectory 306. The pairs of corresponding points line up with one another after transformation. For example, the pairs can be identified based on the corresponding points matching more closely than other points after transformation, such as in aligned matching sub-segments of the trajectories. In the example of FIG. 3C, a first pair of points P includes the anchor of the first trajectory 300 and a non-anchor point of the second trajectory 306. A second pair of points (includes two non-anchor points of the trajectories 300, 306.

Figure 3D:
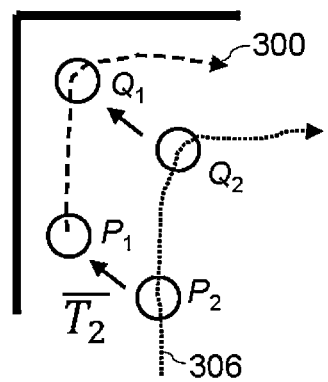
FIG. 3D shows a transform applied to one of the two example trajectories of FIG. 3A.

Returning to the robot's reference frame, as shown in FIG. 3D, the controller 190 then determines a transform $T_2$ that best transforms each point of the one or more pairs of points in the second trajectory 306 into its corresponding point in the first trajectory 300. The controller 190 can utilize a transformation determination algorithm such as the Kabsch algorithm or another algorithm. In this example, the algorithm takes, as input, pairs of points ($P_1$, $P_2$) and ($Q_1$, $Q_2$) and determines a transform that best transforms $P_2$ into $P_1$ and $Q_2$ into $Q_1$ (e.g., a transform that satisfies one or more criteria that are based on alignment between the transformed second trajectory 306 and the first trajectory 300, where higher alignment is favored). In some implementations, the transformation is determined based on many pairs of points across the two trajectories 300, 306. The use of multiple pairs of points can allow for determination of both translation and rotation in the transform $T_2$, to correct both pose position and pose heading. Alternatively, in some implementations, the rotational component of the transform is accounted for during matching of the trajectories in their local reference frame, as shown in FIG. 3C. For example, the curve-matching process can include a determination of a rotation that should be applied to the second trajectory 306 to align matching sub-segments of the second trajectory 306 and the first trajectory 300, and that rotation is included in the transform $T_2$. In addition, some points can be intentionally excluded from being used for determination of $T_2$: for example, points traversed before $P_2$ in the second trajectory 306 have no corresponding points in the first trajectory 300 and can accordingly be excluded from determination of the transform $\hat{T}_2$. Note that one can equivalently calculate the inverse of $\hat{T}_2$ as a transform from the first trajectory 300 to the second trajectory 306 without departing from the scope of this disclosure.

The transform $\hat{T}_2$, when applied to the current pose estimate, represents a correction to the current pose estimate. For example, the transform $\hat{T}_2$ is an inverse of the accumulated drift experienced by the robot, such that updating the pose estimate using the transform $\hat{T}_2$ (e.g., applying the transform $\hat{T}_2$ to the x, y and/or $\theta$ coordinates of the pose estimate) removes the drift contribution to the post estimate.

The form of the transform $\overline{T}_2$ can vary depending on the implementation, for example, depending on how the pose estimate is represented by the pose module 198a. For example, in some implementations transform $T_2$ is represented at least partially by a transformation matrix such as $$\begin{pmatrix} \cos\theta & -\sin\theta & \Delta x \\ \sin\theta & \cos\theta & \Delta y \\ 0 & 0 & 1 \end{pmatrix},$$

which applies a rotation by angle $\theta$ followed by translation by $\Delta x$ and $\Delta y$. In some implementations, heading correction of the pose is performed separately from positional correct of the pose, e.g., by a separate factor, term, and/or step in applying the transform $\overline{T}_2$. For example, applying the transform $\overline{T}_2$ can include applying a positional transform to the x, y coordinates of the pose estimate, and applying an angular correction to the heading $\theta$ of the pose estimate, operations that can be combined into a single operation/calculation or performed separately. Given that points $p_{1,i}$ and $p_{2,i}$ are sets of matched points along matched trajectory sub-segments, estimation of the transform can amount to estimation of a rotation R and a translation t such that $p_{1,i}=Rp_{2,i}+t$.

In some implementations, based on pose estimate correction, the controller 190 can re-evaluate environmental features on the robot's internal map in the mapping module 198b. For example, the controller 190 can apply the transformation $T_2$ to coordinates of a recently-mapped environmental feature and determine whether the transformed coordinates overlap with coordinates of another environmental feature. If so, the controller 190 determines that the two environmental features are in fact the same single environmental feature, and the recently-mapped environmental feature can be removed from the map.

In some implementations, the controller 190 is configured to calculate the uncertainty associated with a calculated transform, such as $\overline{T}_2$. The uncertainty is expressed as a covariance matrix calculated based on a number of matched points between the trajectories, the shapes of the trajectories, and the lengths of the trajectories. The uncertainty can be used to determine actions taken by the robot. For example, if the uncertainty (or an element of the uncertainty) is too high, such as above a threshold uncertainty, then the robot, rather than using the transform to correct the pose estimate, can instead repeat re-localization using an alternative trajectory landmark. As another example, the uncertainty of the transform may be above a threshold uncertainty in a first direction (e.g., the x direction) and below the threshold uncertainty in a second direction (e.g., the y direction). Accordingly, the robot can apply the transform in only the second direction to partially correct the pose estimate, and the robot can select another trajectory landmark to re-localize in the first direction using another determined transform.

Various methods can be used for transform covariance matrix calculation. As one example, it can be assumed that points along both trajectories share a common noise model, such as Gaussian noise $\epsilon_i \sim \mathcal{N}(0, \Sigma_i)$ where i iterates over pairs of matched points. For a transform involving rotation R and translation t (e.g., $p_{1,i}=Rp_{2,i}+t$), it follows that $\overline{p}_1+\epsilon_1=R\overline{p}_1+t+R\epsilon_2$. The Laplace approximation method is applied to obtain a covariance matrix S, where $$S^{-1} = \sum_{i=1}^{n} J_i^T \Sigma^{-1} J_i,$$

in which the Jacobian matrix J is a stacked matrix of Jacobians of n residual functions; the residual functions are based on the assumed common noise model. S is the covariance matrix of the transform.

As another example, a cumulative noise model can be used for estimating the cumulative noise model (covariance matrix)> from n matched paired points $\{(p_{1,i}, p_{2,i})\}$, i=1 to n. Specifically $$\Sigma = \mathbb{E}\left[(p_{2,i}-Rp_{1,i}-t)(p_{2,i}-Rp_{1,i}-t)^T\right] = \frac{1}{n}\sum_{i=1}^{n}\left[(p_{2,i}-Rp_{1,i}-t)(p_{2,i}-Rp_{1,i}-t)^T\right].$$

Besides being used to determine uncertainties of transforms between matched trajectories, the covariance matrix can, in some implementations, be used to indicate whether or not the trajectory match is correct. For example, if a covariance matrix indicates sufficiently high uncertainty for a transform, the controller 190 can conclude that the trajectories do not match (e.g., do not correspond to trajectories around the same environmental feature), and the robot can accordingly perform one or more actions in response, such as selecting another trajectory landmark for re-localization. Also, in some cases a similarity metric (as described above) is itself based at least partially on a transform covariance matrix.

In some implementations, the re-localization behavior is performed not only in response to a sufficiently high pose uncertainty. For example, in some implementations the robot performs re-localization before cleaning in a cleaning mission (e.g., at the start of a cleaning mission), even if the pose uncertainty is not above a threshold uncertainty, in order to improve the results (e.g., spatial coverage) of cleaning. In some implementations, as the robot navigates (for example, during a cleaning mission, such as in COVERAGE behavior), the robot periodically or continuously measures new trajectories, determines whether those new trajectories should align with a previously-stored trajectory landmark (e.g., based on relative positions of the new trajectories and the previously-stored trajectory landmarks), and performs trajectory curve-matching and transform determination in order to obtain a correction for the robot's pose estimate.

Figure 4A:
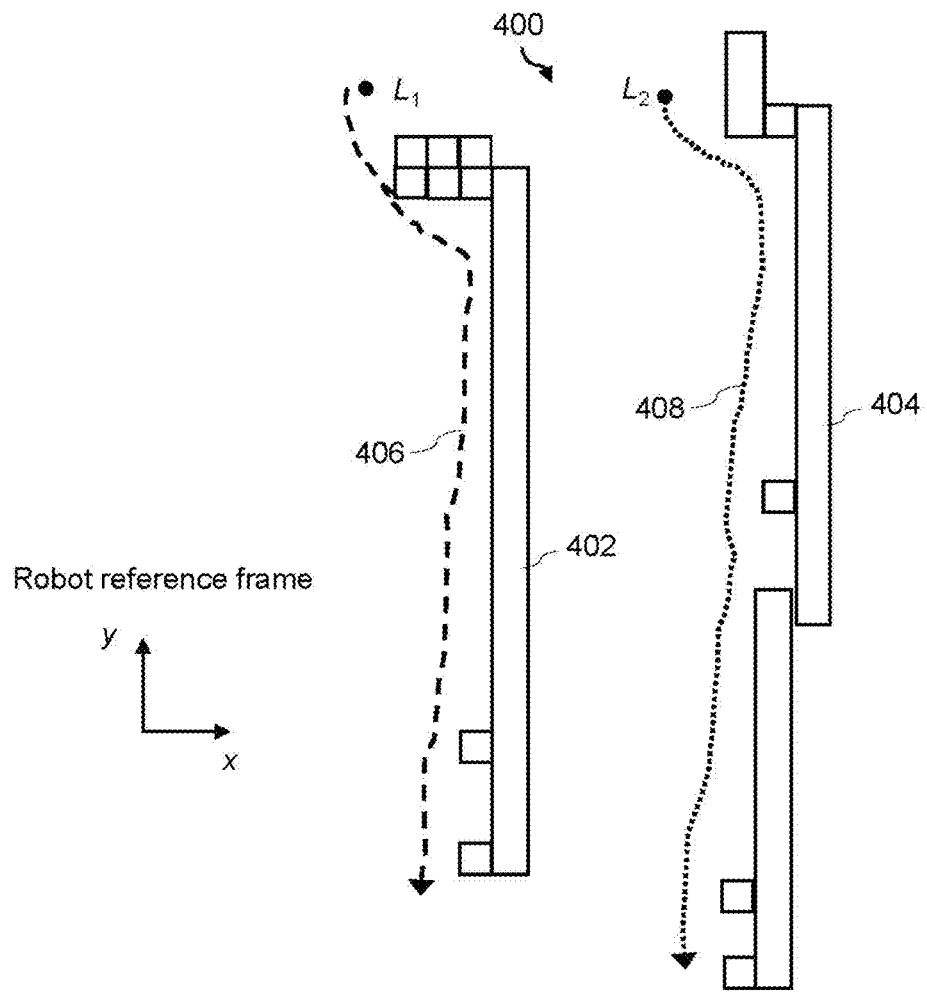
FIG. 4A shows two example trajectories in a robot's reference frame.
Figure 4B:
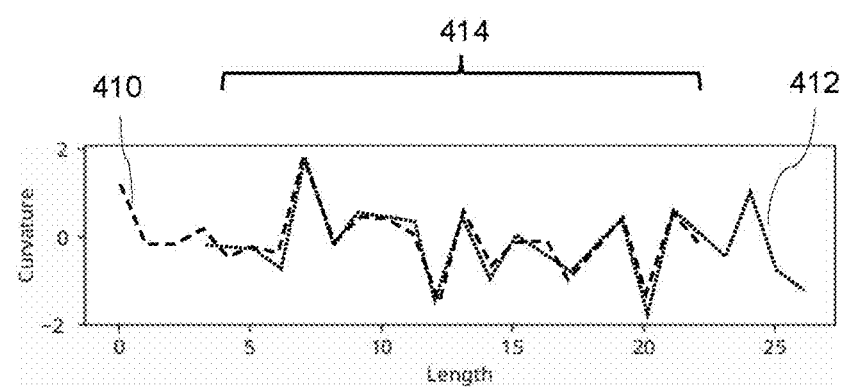
FIG. 4B shows alignment of curvatures corresponding to the two example trajectories of FIG. 4A.
Figure 4C:
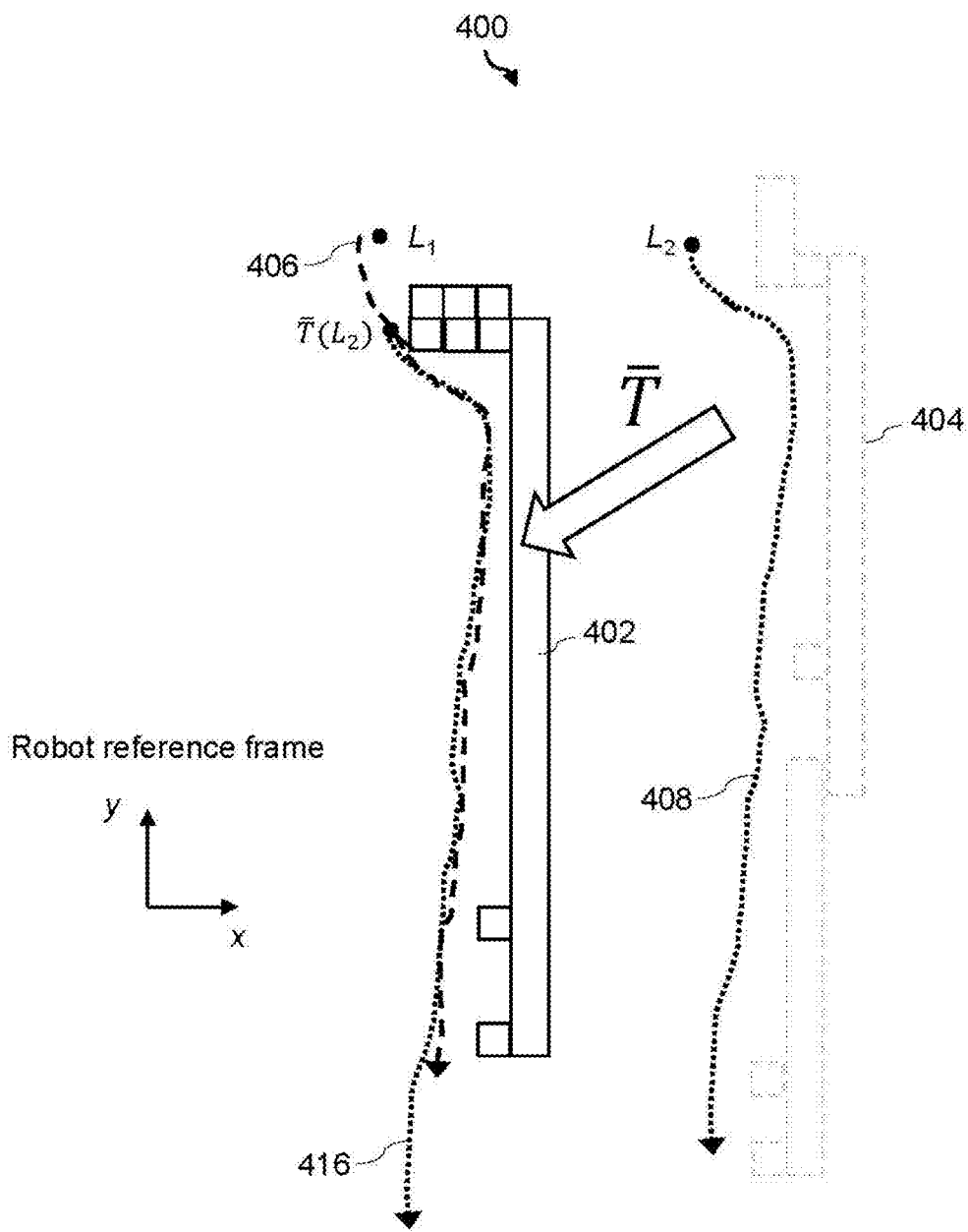
FIG. 4C shows a transform applied to one of the two example trajectories of FIG. 4A.

FIGS. 4A-4C show another example of trajectory-based pose correction by transform determination. An environment 400 includes a wall 402 having various contours. A robot navigates along a first trajectory 406 starting at anchor point $L_1$ and stores the first trajectory 406 as a trajectory landmark. After subsequent navigation (e.g., cleaning), the robot is eventually picked up and moved some distance ("kidnapped") without being able to track its movements, introducing significant drift error into the robot's pose estimate. The robot initiations RE-LOCALIZATION behavior, during which the robot attempts to return to anchor point L₁ to re-localize using the first trajectory 406. The robot re-encounters the wall 402 but, because of the drift error, incorrectly maps the wall 402 as a second wall 404 around which the robot traverses to generate a second trajectory 408. FIG. 4A shows the robot's incorrect map of the environment 400, including the "false wall" 404. Because of variations in room arrangement (e.g., debris or clutter rearranged next to the wall 402), the false wall 404 has an outline that is not exactly the same as the outline of the wall 402.

As described above, the robot determines whether the first trajectory 406 and the second trajectory 408 match. As shown in FIG. 4B, each trajectory is associated with a corresponding length-dependent curvature 410, 412, and the robot performs curve-matching (e.g., using Wolfson's curve-matching algorithm) on the curvatures to identify a matching sub-segment 414 of the curvatures 410, 412. This process can include, for example, aligning the curvatures 410, 412 together by shifting one or both of the curvatures 410, 412 (e.g., shifting one or both of the curvatures 410, 412 after aligning respective anchor points (first points) of the curvatures 410, 412), to account for different starting points of the trajectories 406, 408. As a result of curve-matching (in some implementations, including determining a similarity metric between the curvatures), the robot determines that the first trajectory 406 and the second trajectory 408 match.

The matched sections of the curvatures 410, 412 include pairs of aligned points, which need not exactly align but can, for example, be aligned within a threshold error value. As shown in FIG. 4C, using one or more pairs of matched points, the robot determines a transform T̄ that maps the second trajectory 408 to the first trajectory 406, e.g., using the Kabsch algorithm. In this example, the transform T̄ imposes transformations in both x and y directions to produce a transformed trajectory 416. The robot applies the same transform T̄ to the robot's pose estimate to correct the pose estimate's accumulated drift. In addition, the robot recognizes that the false wall 404 is actually a translated version of the wall 402, and accordingly the robot removes the false wall 404 from the robot's internal map.

The robotic behaviors disclosed and illustrated herein may include the routines and behaviors as disclosed in U.S. patent application Ser. No. 13/790,643, filed on Mar. 8, 2013, and titled "Simultaneous Localization and Mapping for a Mobile Robot," which is herein incorporated by reference in its entirety. For example, the pose estimation, obstacle following, and pose confidence computations of that disclosure may also be alternatively implemented into the robotic systems of this application.

Application to and Advantages of Clutter Landmarks

As noted above, because trajectory landmarks need not be straight, they can correspond to environmental features besides straight walls, such as furniture (beds, bookshelves, chairs, tables, wardrobes, lamps), storage bins, trash cans, and various other items (e.g., pet crates/beds) that have non-straight (e.g., curved and/or otherwise irregular) perimeters and are classified as "clutter." Pose estimate correction using transforms between non-straight trajectories can provide advantages compared to pose estimate correction based on straight walls. Typically, pose estimate correction based on straight walls requires multiple landmarks to perform full re-localization, because each straight wall can be used to re-localize only in a direction perpendicular to the wall, and in some cases also to re-localize the heading (theta) of the robot (e.g., based on a heading measured by the robot with respect to the wall when first contacting the wall). By contrast, pose estimate correction as described in this disclosure can provide a full correction (x, y, and theta) using re-localization on a single stored landmark, reducing mission time devoted to re-localization. The addition of clutter landmarks also generally increases landmark availability to increase a total number of landmarks, which can allow for improved map quality and mission completion and can reduce mission time devoted to re-localization. For example, the robot is, at any given time, more likely to be near a landmark.

Lengthwise position along a straight wall can be determined if the robot first navigates to an endpoint of the wall, using that endpoint as a reference point for subsequent traversal. But (i) this adds time to the re-localization process, which is undesirable, and (ii) this can put the robot farther away from its initial, pre-re-localization position because of the need to navigate to the endpoint. When the robot eventually returns to its initial position (e.g., to perform cleaning after re-localizing), the extra distance can mean that extra drift has accumulated in the meantime, rendering the re-localization process less meaningful and effective.

In some implementations, when a trajectory landmark has been classified as a "clutter" landmark (e.g., based on the trajectory being a closed-loop trajectory and/or based on observed shifting of the trajectory), the trajectory landmark can be treated differently from other landmarks (e.g., wall landmarks) in at least some ways. A match determination between clutter-associated trajectories can be made based on lower trajectory similarities than for wall-associated trajectories, to allow for the variability inherent in some cluster landmarks. For example, a minimum threshold similarity metric corresponding to a trajectory match can be lower for clutter-associated trajectories than for wall-associated trajectories. The robot is more likely to determine a match, based on curve-matching/trajectory similarity, for a clutter trajectory landmark than for a non-clutter (e.g., wall) trajectory landmark).

Clutter landmarks can also be used to perform forms of re-localization that seek to identify a general area in which the robot is located, rather than to perform more fine-tuned position/heading re-localization. This is because clutter such as furniture can routinely be moved within a room, within a particular section, (e.g., building wing), and/or within a floor (building level) of an environment. Upon measuring a new trajectory, the robot can match the new trajectory with a previously-stored clutter trajectory landmark and, based on the match, determine that the robot is in a general area (such as a room or a floor) previously associated with the clutter trajectory landmark. The match does not require that the new trajectory and the previously-stored clutter trajectory landmark match in absolute position. For example, in some implementations the new trajectory and the previously-stored clutter trajectory are in different absolute locations, but a match is still established to identify a general area of the robot. This can allow for rough and/or initial re-localization to be followed by more fine-tuned re-localization, e.g., using a transform-based approach as described throughout this disclosure.

Treatment of Straight Landmarks

Although substantially straight trajectory landmarks (for example, corresponding to straight walls) can sometimes be avoided as described above, in some implementations these landmarks are included and used for re-localization. However, straight landmarks such as straight walls can present certain difficulties. For example, while the robot can measure its distance from a straight wall and its heading angle relative to the wall, the robot cannot determine its position along a wall using local sensor data alone. Measuring the robot's distance along the wall requires the robot to navigate to an end of the wall each time the robot wishes to re-localize using the wall. This takes time away from other robot operations, such as cleaning.

Accordingly, in some implementations, special handling procedures can be applied to straight trajectory landmarks. For example, in some implementations a pose graph optimizer or other algorithm, used to correct pose estimations using newly-obtained trajectory data, accepts, as input, a transform identifying transformations in three dimensions such as x, y, and θ. However, if a straight trajectory landmark (such as a wall) was used to obtain the transform, then the transform only constrains two of three dimensions: perpendicular distance from the wall and bearing with respect to the wall; a transform for distance parallel to the wall is not available. Accordingly, the robot can provide, as a transform for the distance parallel into the wall, into the pose graph optimizer or other algorithm, a randomly-selected value, or a dummy value, that has little or no physical significance. The robot also provides, as input for the pose graph optimizer or other algorithm, a high uncertainty value corresponding to the transform for the distance parallel to the wall, so that the pose graph optimizer or other algorithm substantially or entirely discounts the provided transform for the distance parallel to the wall, while still functioning properly. The uncertainty value can, for example, be at least five times a magnitude of a next-highest uncertainty provided into the pose graph optimizer, at least ten times the magnitude of the next-highest uncertainty, at least fifty times the next-highest uncertainty, or at least 100 times the next-highest uncertainty. In this manner, pose graph optimizers and other algorithms that are not specifically designed to handle straight trajectory landmarks can be used to analyze those landmarks without requiring special adaption of the pose graph optimizers and other algorithms themselves. The pose graph optimizers and other algorithms can therefore be flexibly applied to both curved and straight trajectory landmarks, using both in combination to provide pose estimate corrections for the same map/same robot. An example of a pose graph optimizer is the gtsam library provided by the Georgia Institute of Technology.

Another example of special methods for analysis of straight trajectory segments relates to identifying whether two straight trajectory segments, corresponding to two walls, correspond to the same wall. The data available for this analysis can be limited, such as perpendicular distance measurements to the walls and headings relative to the walls. A covariance matrix of relative motion between nodes along the walls is calculated based on measurements in a pose graph. Elements corresponding to directions of the walls are discarded, and a 2×2 cropped covariance matrix is obtained. The covariance matrix is used in conjunction with a relative angle between the two walls (as determined by the robot's headings with respect to each wall) and in conjunction with a perpendicular distance between the two walls (as obtained based on the relative motion between the nodes along the walls) to determine a likelihood of the two walls being the same wall. For example, the likelihood can be inversely proportional to a Mahalanobis distance between the walls.

Navigation Flow Chart

Figure 5A:
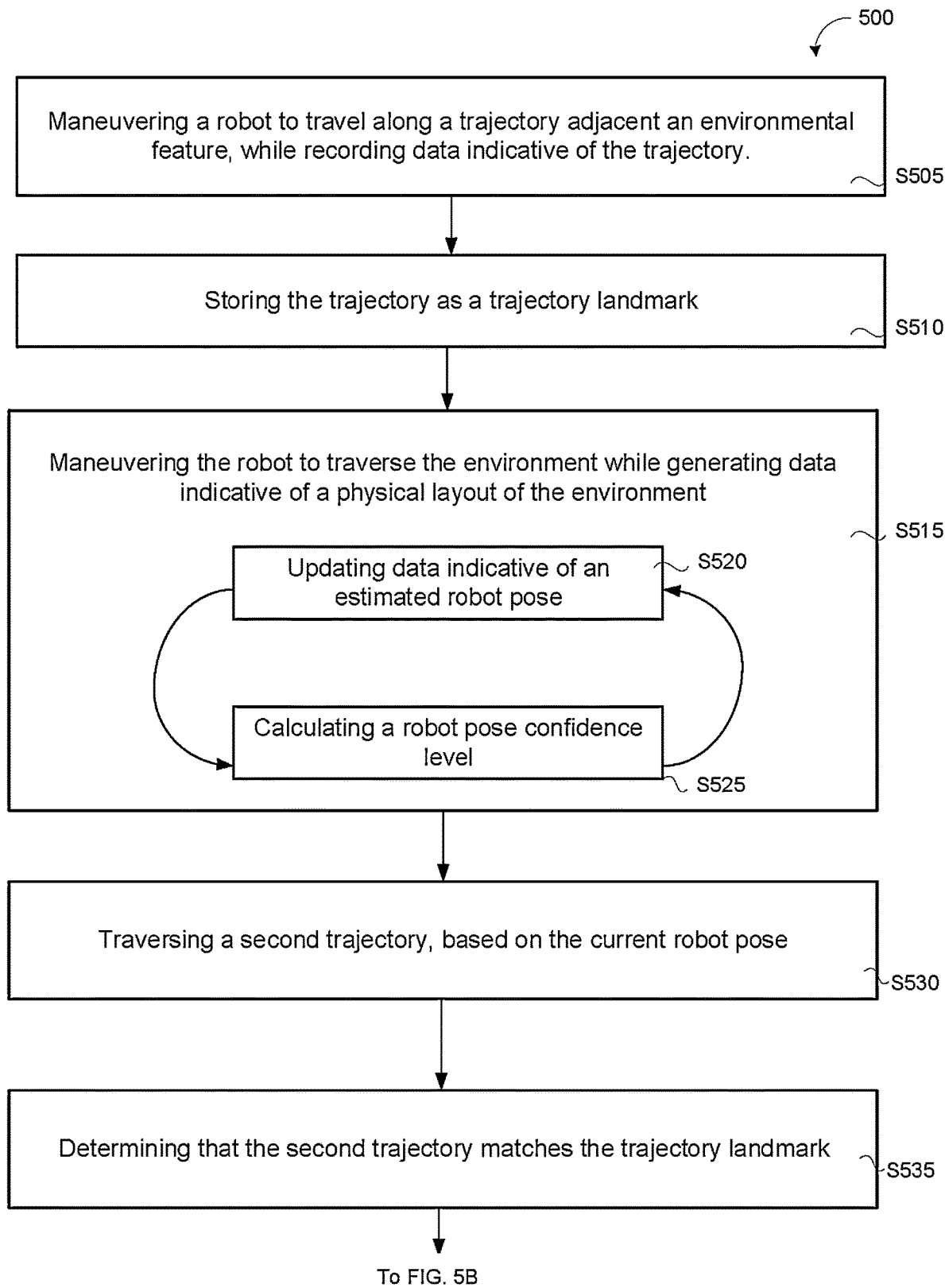
FIGS. 5A-5B show an example robot control process.
Figure 5B:
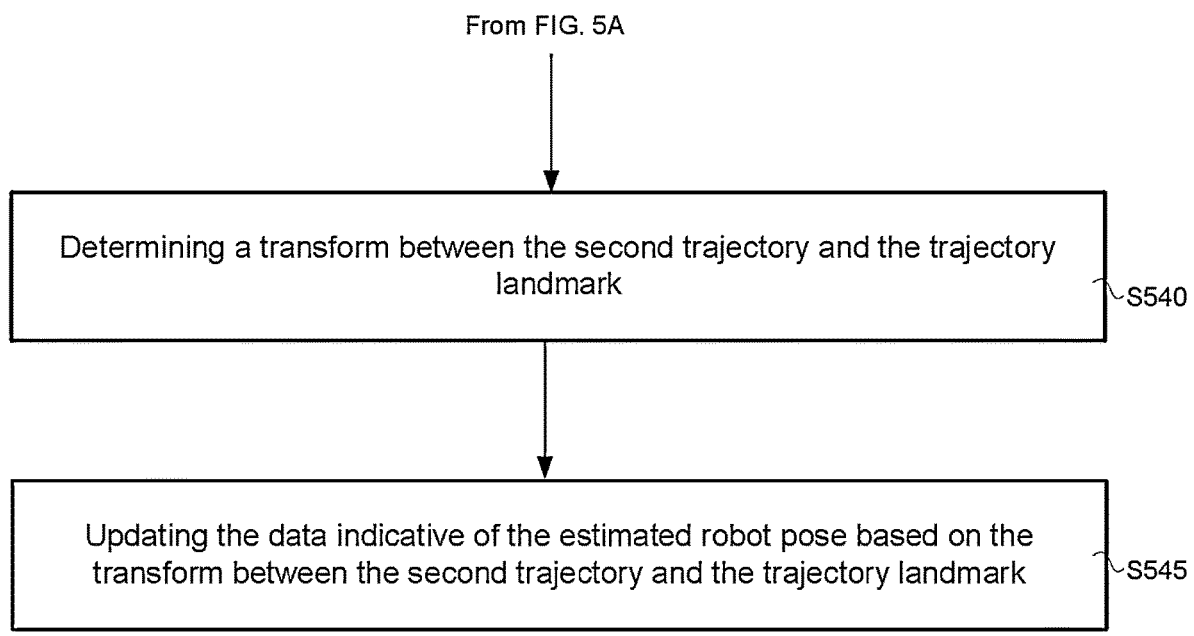

The flow chart 500 of FIGS. 5A-5B shows a method of navigating an autonomous robot 100 within an environmental having environmental features. The method can include aspects of the navigation, mapping, localization, and other SLAM-related software and hardware described above with respect to FIGS. 1A-4C. The method can be performed partially or entirely by a controller of a mobile robot, such as controller 190. In some implementations, at least some of the operations of the method (e.g., curve-matching operations and/or transform-determination operations) can be performed by another computing system, such as a docking station computer system or a remote computer system (e.g., a cloud-based computer system).

In step S505, the controller maneuvers the robot 100 (e.g., in TRAJECTORY MAPPING behavior) to control the robot to travel along a trajectory adjacent an environmental feature and record data indicative of the trajectory. To maneuver the robot 100, the controller can execute the TRAJECTORY MAPPING behavior that utilizes the bumper sensor system, an infrared sensor system, and/or another sensor system, to navigate the robot around the perimeter of the environmental feature. The TRAJECTORY MAPPING behavior can include execution of the pose module 198a, the mapping module 198b, and the trajectory module 198c. As described above, these modules 198a-c can cooperate to allow the robot 100 to record data indicative of the contours, length and/or directionality of the trajectory.

In step S510, the controller (e.g., the controller 190 of FIG. 1C) stores the trajectory as a trajectory landmark, e.g., determines to store the trajectory as a trajectory landmark and accordingly stores the trajectory as the trajectory landmark. The controller can consider various factors as described above to decide whether or not to store the trajectory, such as a uniqueness of the trajectory, a spatial and/or temporal length of the trajectory, and/or an ambiguity of the trajectory. A trajectory landmark, as stored, can include a collection of spatial coordinates, a curvature measure or related measure, a time taken to traverse the trajectory, and/or other types of data as described herein.

In step S515, the controller maneuvers the robot 100 in a coverage mode to control the robot 100 to traverse the environment while the robot 100 performs a function. The controller also generates data indicative of a physical layout of the environment, including environment boundaries and obstacle perimeters detected while the robot performs the function. The controller can execute the COVERAGE behavior to maneuver the robot in the coverage mode. The robot, as a result, can traverse the area using one of the coverage patterns described earlier in relation to the COVERAGE behavior. The function performed by the robot can include a cleaning function executed by, for example, the cleaning system 103 of FIG. 1D. During COVERAGE behavior, the controller can instruct the robot to execute the pose module 198a and the mapping module 198b. The controller can utilize the mapping module 198b to generate the data indicative of the physical layout of the area, which can correspond to, for example, an occupancy grid stored on the memory storage element of the robot.

While performing the step S515, the controller performs steps S520 and S525. In step S520, the controller updates data indicative of a current robot pose within the environment. The current robot pose includes a current location and orientation (heading) of the robot relative to global coordinates of the environment. The controller updates the data indicative of the current robot pose based on sensor data such as, for example, odometry data. The pose module 198a can allow the controller to estimate the pose of the robot within the environment. In step S525, the controller calculates a robot pose confidence level. The confidence level can be computed based on estimated drift and error that may have accumulated during motion of the robot. The controller continues to perform the steps S520 and S525 until the robot pose confidence level falls below a predetermined confidence limit.

In step S530, in response to the robot pose confidence level being below a predetermined confidence limit, the controller maneuvers the robot to traverse a second trajectory and record data indicative of the second trajectory. For example, the controller maneuvers the robot to a suspected location of the trajectory landmark, based on the current robot pose, and then maneuvers the robot along a suspected path of the trajectory landmark. As the controller calculates the robot pose confidence level in the step S525, the controller can continuously compare the robot pose confidence level to the predetermined confidence limit. Upon detecting a robot pose confidence level that falls beneath the predetermined confidence limit, the controller can execute the RE-LOCALIZATION behavior to re-localize the robot. The RE-LOCALIZATION behavior can instruct the robot to select the trajectory landmark from among multiple candidate trajectory landmarks, based on factors that can include, for example, distances of the candidate trajectory landmarks to the robot, past successes/failures using the candidate trajectory landmarks for re-localization, uniquenesses of the landmarks, and/or other factors.

In step S535, the controller determines whether the second trajectory is a match for the trajectory landmark. For example, the controller performs curve-matching between the second trajectory and the first trajectory and determines a metric of similarity characterizing a match between the second trajectory and the first trajectory. Step S535 can include shifting reference frames of the trajectories, such as aligning the references frames so that anchor points (starts) of the trajectories coincide, and subsequently performing curve-matching within this joint local coordinate system.

In step S540, in response to determining that the second trajectory is a match for the trajectory landmark (e.g., in response to determining that the metric of similarity is above a threshold similarity), the controller determines a transform between the second trajectory and the trajectory landmark (the first trajectory). For example, the controller can determine a transform that approximately (e.g., best, according to one or more criteria) aligns one or more pairs of corresponding points of the second trajectory and the trajectory landmark. The pairs of points can be identified from the aligned trajectories obtained from curve-matching. The transform can be a transform in x, y, and/or θ.

In step S545, the controller uses the transform to update the robot's estimated pose. For example, the transform can represent an inverse to a transform of accumulated drift and other errors in the pose estimate, such that applying the transform to a current estimated position aligns the current estimated position with a true position in global coordinates.

The robots and processes described in this disclosure can be applied to perform mapping of environments, in some cases without requiring an imaging camera and associated systems (e.g., a visible-light camera configured to take images that are analyzed by a processing system to identify objects in the images based on appearances of the objects). For example, because trajectories correspond to objects in the environment around which the robot navigates, the robot, after traversing a new trajectory, can add an object corresponding to that trajectory to an internal map generated by and/or stored on the robot. For example, if the trajectory is a closed-loop trajectory, the robot can add a new object to the map, the new object covering the area encircled by the closed-loop trajectory. Even if a trajectory is not closed-loop, in some implementations the robot can predict a shape of an object based on a trajectory around a portion of the object and add the predicted shape to the map accordingly. The trajectories themselves can also be added to the maps. This functionality extends camera-less mapping capabilities, with high spatial resolution provided by trajectory data, to the insides of rooms, as opposed to being limited to straight walls at rooms boundaries as for straight-line-only camera-less mapping/re-localization processes. In some implementations, maps including one or more objects added to the maps based on trajectory mapping (e.g., curved trajectories) can be provided to a user device such as a mobile phone, a tablet, or a computer, in an application or over a web browser, for display on the user-facing device. The user can browse the map and, in some implementations, update the map, such as by adding additional objects to the map or moving objects already on the map. This mapping functionality can be provided even when the robot does not include high-cost imaging cameras and associated systems.

The SLAM systems disclosed herein may include aspects of other SLAM systems known in the art. For example, the algorithms and structures used in VSLAM system of the disclosure from U.S. application Ser. No. 10/739,902, filed on Dec. 17, 2003, and titled "Systems and methods for using multiple hypotheses in a visual simultaneous localization and mapping system" can be implemented into the SLAM systems described in this application. This disclosure is incorporated by reference in this application.

While a number of examples have been described for illustration purposes, the foregoing description is not intended to limit the scope of the implementations disclosed herein. There are and will be other examples and modifications within the scope of the following claims.

What is claimed is:

1. A method of navigating an autonomous cleaning robot in an environment, the method comprising:
  maneuvering the autonomous cleaning robot through the environment along an overall trajectory, including maneuvering the autonomous cleaning robot around a feature in the environment along a first trajectory included in the overall trajectory;
  selectively storing, as one or more trajectory landmarks, data characterizing only a portion of the overall trajectory, including storing data characterizing the first trajectory as a trajectory landmark, wherein selectively storing the data characterizing the first trajectory as the trajectory landmark comprises selecting the first trajectory for use as a landmark based on at least one of:
    a speed of the autonomous cleaning robot during traversal of the first trajectory, or
    a time taken by the autonomous cleaning robot to traverse the first trajectory;
  maneuvering the autonomous cleaning robot along a second trajectory;
  comparing data characterizing the second trajectory to the trajectory landmark;
  based on comparing the data characterizing the second trajectory to the trajectory landmark, determining that the first trajectory matches the second trajectory;
  determining a transform that aligns the first trajectory with the second trajectory; and
  applying the transform to an estimate of a position of the autonomous cleaning robot as a correction of the estimate.

2. The method of claim 1, wherein selecting the first trajectory for use as the landmark is based on a curvature of the first trajectory.

3. The method of claim 1, wherein selecting the first trajectory for use as the landmark is based on the first trajectory being classified as a clutter trajectory.

4. The method of claim 1, wherein the position is defined by a first spatial coordinate, a second spatial coordinate, and an orientation, and
wherein applying the transform to the estimate comprises correcting estimates of the first spatial coordinate, the second spatial coordinate, and the orientation of the estimate with the transform.

5. The method of claim 1, wherein maneuvering the autonomous cleaning robot along the first trajectory comprises:
maneuvering the autonomous cleaning robot from an anchor location to a second location;
determining that the second location is the anchor location; and
in response to determining that the second location is the anchor location, ending navigating of the first trajectory.

6. The method of claim 1, wherein maneuvering the autonomous cleaning robot along the second trajectory is performed in response to determining that a confidence level of the estimate is below a threshold value.

7. The method of claim 1, wherein comparing the data characterizing the second trajectory to the trajectory landmark comprises performing curve-matching between the second trajectory and the first trajectory to identify two matching sub-segments of the first trajectory and the second trajectory, the two matching sub-segments being only a portion of each of the first trajectory and the second trajectory, respectively.

8. The method of claim 7, wherein performing the curve-matching comprises performing curve-matching between
a curvature of the second trajectory and a curvature of the first trajectory, or
a turning radius of the second trajectory and a turning radius of the first trajectory.

9. The method of claim 7, wherein performing the curve-matching comprises evaluating the first trajectory and the second trajectory in a common reference frame in which an anchor of the first trajectory is aligned with an anchor of the second trajectory.

10. The method of claim 1, wherein determining that the first trajectory matches the second trajectory comprises:
determining a distance metric between the first trajectory and the second trajectory, and
determining that the distance metric is less than a threshold value.

11. The method of claim 1, wherein determining the transform comprises:
identifying one or more pairs of corresponding points between the first trajectory and the second trajectory; and
determining the transform as a transform that aligns the one or more pairs of corresponding points with one another.

12. The method of claim 11, (i) wherein a first pair of the one or more pairs includes an anchor of the first trajectory or an anchor of the second trajectory, or
(ii) the one or more pairs lie in matching sub-segments of the first trajectory and the second trajectory, or
both (i) and (ii).

13. The method of claim 1, comprising:
based on comparing the data characterizing the second trajectory to the trajectory landmark, determining that an environmental feature maneuvered around to generate the second trajectory is the feature; and
based on determining that the environmental feature maneuvered around to generate the second trajectory is the feature, correcting an internal map of the autonomous cleaning robot.

14. The method of claim 1, wherein selecting the first trajectory for use as the landmark is based on an ambiguity of the first trajectory.

15. The method of claim 14, comprising determining the ambiguity, wherein determining the ambiguity comprises:
searching for one or more transforms that transform the first trajectory into itself.

16. The method of claim 1, wherein the transform represents an inverse of accumulated drift in the estimate of the position of the autonomous cleaning robot.

17. The method of claim 1, wherein storing the data characterizing the first trajectory comprises storing the time taken by the autonomous cleaning robot to traverse the first trajectory, and
wherein maneuvering the autonomous cleaning robot along the second trajectory comprises:
selecting the trajectory landmark from among a plurality of candidate trajectory landmarks based on the time taken to traverse the first trajectory; and
based on selecting the trajectory landmark, maneuvering the autonomous cleaning robot to an estimated location of the trajectory landmark.

18. The method of claim 1, wherein maneuvering the autonomous cleaning robot along the second trajectory comprises:
determining a direction of a major axis of an ellipse corresponding to a covariance matrix characterizing uncertainty in an estimate of the position;
selecting the trajectory landmark from among a plurality of candidate trajectory landmarks based on the direction of the major axis; and
based on selecting the trajectory landmark, maneuvering the autonomous cleaning robot to an estimated location of the trajectory landmark.

19. The method of claim 1, wherein selecting the first trajectory for use as a landmark is based on the first trajectory comprising a closed-loop trajectory.

20. The method of claim 19, wherein the feature comprises furniture.

21. The method of claim 1, comprising classifying the trajectory landmark as a clutter landmark based on at least one of:
the first trajectory comprising a closed-loop trajectory, or
the feature in the environment moving over time.

22. The method of claim 1, comprising:
classifying a second trajectory landmark, corresponding to a third trajectory along which the autonomous cleaning robot maneuvered, as a clutter landmark;
maneuvering the autonomous cleaning robot along a fourth trajectory;
comparing the third trajectory to the fourth trajectory;
based on comparing the third trajectory to the fourth trajectory, determining that the third trajectory matches the fourth trajectory, and that the third trajectory and the fourth trajectory are in different absolute locations; and
based on the second trajectory landmark being classified as a clutter landmark, and based on determining that the third trajectory matches the fourth trajectory and that the third trajectory and the fourth trajectory are in different absolute locations, determining a room in the environment, a section of the environment, or a level of the environment in which the autonomous cleaning robot is located.

23. The method of claim 1, wherein maneuvering the autonomous cleaning robot along the second trajectory is performed as a step before cleaning in a cleaning mission.

24. The method of claim 1, wherein maneuvering the autonomous cleaning robot along the first trajectory is performed during a cleaning mission.

25. The method of claim 1, wherein the feature comprises a wall,
wherein applying the transform to the estimate of the position comprises inputting the transform into a pose graph optimizer, and wherein inputting the transform into the pose graph optimizer comprises:
inputting, into the pose graph optimizer, a dummy value as a transform in a direction parallel to the wall, and a second value as a transform in a direction perpendicular to the wall; and
inputting, into the pose graph optimizer, a first uncertainty corresponding to the dummy value and a second uncertainty corresponding to the second value, the first uncertainty at least ten times a value of the second uncertainty.

26. The method of claim 1, wherein the feature comprises a first wall, and
wherein the second trajectory corresponds to motion in a vicinity of a second wall, the method comprising:
determining a cropped covariance matrix of relative motion in the first trajectory and in the second trajectory, the cropped covariance matrix excluding elements corresponding to motion parallel to the first wall or parallel to the second wall, and
determining, based on the cropped covariance matrix, whether the first wall is the second wall.

27. An autonomous cleaning robot comprising:
a drive system configured to move the autonomous cleaning robot about a floor surface in an environment;
a cleaning system configured to clean the floor surface as the autonomous cleaning robot moves about the floor surface;
a sensor system; and
a controller operably coupled to the drive system, the cleaning system, and the sensor system, the controller configured to perform operations comprising:
using the drive system, maneuvering the autonomous cleaning robot through the environment along an overall trajectory, including maneuvering the autonomous cleaning robot around a feature in the environment along a first trajectory;
selecting storing, as one or more trajectory landmarks, data characterizing only a portion of the overall trajectory, including storing data characterizing the first trajectory as a trajectory landmark, the data characterizing the first trajectory collected using the sensor system, wherein selectively storing the data characterizing the first trajectory as the trajectory landmark comprises selecting the first trajectory for use as a landmark based on at least one of:
a speed of the autonomous cleaning robot during traversal of the first trajectory, or
a time taken by the autonomous cleaning robot to traverse the first trajectory;
using the drive system, maneuvering the autonomous cleaning robot along a second trajectory;
comparing data characterizing the second trajectory to the trajectory landmark;
based on comparing the data characterizing the second trajectory to the trajectory landmark, determining that the first trajectory matches the second trajectory;
determining a transform that aligns the first trajectory with the second trajectory; and
applying the transform to an estimate of a position of the autonomous cleaning robot as a correction of the estimate.

28. The autonomous cleaning robot of claim 27, wherein selecting the first trajectory for use as the landmark is based on a curvature of the first trajectory.

29. The autonomous cleaning robot of claim 27, wherein the position is defined by a first spatial coordinate, a second spatial coordinate, and an orientation, and
wherein applying the transform to the estimate comprises correcting estimates of the first spatial coordinate, the second spatial coordinate, and the orientation of the estimate with the transform.

30. The autonomous cleaning robot of claim 27, wherein maneuvering the autonomous cleaning robot along the first trajectory comprises:
maneuvering the autonomous cleaning robot from an anchor location to a second location;
determining that the second location is the anchor location; and
in response to determining that the second location is the anchor location, ending navigating of the first trajectory.

* * * * *